(12) United States Patent
Bhushan et al.

(10) Patent No.: US 12,355,649 B2
(45) Date of Patent: *Jul. 8, 2025

(54) SYSTEMS AND METHODS FOR MULTIPLE ROUND TRIP TIME (RTT) ESTIMATION IN WIRELESS NETWORKS

(71) Applicant: QUALCOMM Incorporated, San Diego, CA (US)

(72) Inventors: Naga Bhushan, San Diego, CA (US); Rayman Wai Pon, Cupertino, CA (US); Stephen William Edge, Escondido, CA (US); Sven Fischer, Nuremberg (DE); Guttorm Ringstad Opshaug, Redwood City, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,247

(22) Filed: May 10, 2022

(65) Prior Publication Data
US 2022/0272014 A1 Aug. 25, 2022

Related U.S. Application Data

(63) Continuation of application No. 16/223,073, filed on Dec. 17, 2018, now Pat. No. 11,362,921.
(Continued)

(51) Int. Cl.
H04L 43/0864 (2022.01)
H04B 17/364 (2015.01)
(Continued)

(52) U.S. Cl.
CPC ....... H04L 43/0864 (2013.01); H04B 17/364 (2015.01); H04L 1/16 (2013.01);
(Continued)

(58) Field of Classification Search
CPC ..... H04L 43/0864; H04L 1/16; H04L 1/1867; H04L 1/08; H04B 17/364; H04B 7/0413;
(Continued)

(56) References Cited

U.S. PATENT DOCUMENTS 6,681,099 B1   1/2004   Keranen et al.
7,065,369 B2   6/2006   Tang et al.
(Continued)

FOREIGN PATENT DOCUMENTS

CN   1271419 A   10/2000
CN   1444833 A   9/2003
(Continued)

OTHER PUBLICATIONS

Cambridge Positioning Systems: "Standalone SMLC", TSG-RAN WG2 Meeting No. 33, TSG R2-02-3026, Nov. 12-15, Sophia Antipolis, France, XP050122510, 6 Pages.
(Continued)

Primary Examiner — Chirag G Shah
Assistant Examiner — Joshua Smith
(74) Attorney, Agent, or Firm — Thien T. Nguyen

(57) ABSTRACT

Disclosed are techniques for determining round-trip times (RTTs) between a user equipment (UE) and multiple base stations. In an aspect, the UE transmits an RTT measurement signal whose arrival time is measured by each of the base stations, and each of the base stations returns an RTT response signal whose arrival times are measured by the UE. In another aspect, the base stations each transmit an RTT measurement signal and the UE returns an RTT response signal. The receiver of the RTT measurement signal may include the measured arrival time in a payload of the RTT Response signal. Alternatively, the measured arrival time(s) of the RTT Measurement signal(s) and the transmission time(s) of the RTT Response signal(s) are sent in a separate
(Continued)

message. The RTT signals can be wideband signals using low reuse resources.

44 Claims, 18 Drawing Sheets

Related U.S. Application Data

(60) Provisional application No. 62/607,899, filed on Dec. 19, 2017.

(51) Int. Cl.

| | | |
|---|---|---|
| *H04L 1/16* | (2023.01) | |
| *H04W 16/14* | (2009.01) | |
| *H04W 24/10* | (2009.01) | |
| *H04W 56/00* | (2009.01) | |
| *H04W 64/00* | (2009.01) | |
| *H04W 72/0446* | (2023.01) | |
| *H04W 72/0453* | (2023.01) | |
| *H04W 72/20* | (2023.01) | |
| *H04B 7/0413* | (2017.01) | |
| *H04L 1/1867* | (2023.01) | |

(52) U.S. Cl.
CPC ........... *H04W 16/14* (2013.01); *H04W 24/10* (2013.01); *H04W 56/0005* (2013.01); *H04W 56/0065* (2013.01); *H04W 64/00* (2013.01); *H04W 72/0446* (2013.01); *H04W 72/0453* (2013.01); *H04W 72/20* (2023.01); *H04B 7/0413* (2013.01); *H04L 1/1867* (2013.01)

(58) Field of Classification Search
CPC ................. H04W 16/14; H04W 24/10; H04W 56/0005; H04W 56/0065; H04W 64/00; H04W 72/0446; H04W 72/0453; H04W 72/20; H04W 56/009; G01S 13/825; G01S 5/14

See application file for complete search history.

(56) References Cited

U.S. PATENT DOCUMENTS

| | | | |
|---|---|---|---|
| 8,781,492 | B2 | 7/2014 | Das et al. |
| 9,253,599 | B1 | 2/2016 | Venkatraman et al. |
| 9,838,845 | B2 | 12/2017 | Xiao et al. |
| 11,362,921 | B2* | 6/2022 | Bhushan ............. H04L 43/0864 |
| 2002/0094820 | A1 | 7/2002 | Keranen et al. |
| 2003/0087647 | A1* | 5/2003 | Hurst ..................... H04W 64/00 455/456.1 |
| 2004/0132452 | A1 | 7/2004 | Lee |
| 2005/0192024 | A1 | 9/2005 | Sheynblat |
| 2007/0115842 | A1 | 5/2007 | Matsuda et al. |
| 2007/0123268 | A1 | 5/2007 | Parata |
| 2008/0318596 | A1 | 12/2008 | Tenny |
| 2009/0073031 | A1 | 3/2009 | Kim |
| 2010/0054139 | A1 | 3/2010 | Chun et al. |
| 2011/0158164 | A1 | 6/2011 | Palanki et al. |
| 2012/0129551 | A1 | 5/2012 | Islam |
| 2012/0314587 | A1* | 12/2012 | Curticapean .......... G01S 5/0284 370/252 |
| 2013/0033999 | A1 | 2/2013 | Siomina et al. |
| 2013/0039208 | A1 | 2/2013 | Jonsson et al. |
| 2013/0250853 | A1 | 9/2013 | Eravelli |
| 2014/0016485 | A1* | 1/2014 | Curticapean .......... H04W 64/00 370/252 |
| 2014/0022920 | A1* | 1/2014 | Dua .................... H04W 64/003 370/252 |
| 2014/0051460 | A1 | 2/2014 | Dua et al. |
| 2014/0073352 | A1 | 3/2014 | Aldana et al. |
| 2014/0162704 | A1 | 6/2014 | Choi et al. |
| 2014/0269400 | A1 | 9/2014 | Aldana et al. |
| 2014/0348051 | A1 | 11/2014 | Park et al. |
| 2015/0219749 | A1 | 8/2015 | Dua et al. |
| 2016/0014565 | A1 | 1/2016 | Segev et al. |
| 2016/0072689 | A1 | 3/2016 | Aldana et al. |
| 2016/0150500 | A1* | 5/2016 | Agrawal ................. H04L 1/18 370/328 |
| 2017/0289933 | A1 | 10/2017 | Segev et al. |
| 2018/0049272 | A1* | 2/2018 | Bagheri ................ H04W 24/02 |
| 2019/0190806 | A1 | 6/2019 | Bhushan et al. |
| 2019/0305912 | A1 | 10/2019 | Kazmi et al. |

FOREIGN PATENT DOCUMENTS

| | | |
|---|---|---|
| CN | 1798434 A | 7/2006 |
| CN | 104937861 A | 9/2015 |
| CN | 106488550 A | 3/2017 |
| EP | 3197200 A1 | 7/2017 |
| JP | 2007127584 A | 5/2007 |
| KR | 20060104257 A | 10/2006 |
| WO | 2010135712 | 11/2010 |
| WO | 2011137396 A1 | 11/2011 |
| WO | WO-2014011381 | 1/2014 |
| WO | 2014043207 A1 | 3/2014 |
| WO | WO-2016036455 A1 | 3/2016 |
| WO | WO-2017142725 | 8/2017 |

OTHER PUBLICATIONS

CATT: "UL HARQ Timing for TDD", 3GPP TSG RAN WG1 Meeting #52bis, Mar. 26, 2008, R1-081328, Shenzhen, China, Mar. 31-Apr. 4, 2008, 4 Pages.

Huawei, et al., "Overview of Bandwidth Part, CA, and DC Operation Including SRS Switching", 3GPP TSG RAN WG1 Meeting NR#3, R1-1715425, Nagoya, Japan, Sep. 18, 2017-Sep. 21, 2017, Sep. 21, 2017 (Sep. 21, 2017), 14 Pages, Section 7.2.

International Search Report and Written Opinion—PCT/US2018/066259—ISA/EPO—Apr. 2, 2019.

LG Electronics Inc: "Support NR Positioning Under Dual Connectivity", 3GPP TSG-RAN WG2 Meeting #99bis, R2-1711691, Prague, Czech Republic, Oct. 9-13, 2017, XP051355731, 2 Pages.

NTT Docomo, et al., "New Radio (NR) Access Technology", 3GPP Draft, 3GPP TSG RAN Meeting #77, RP-171783, SR ON NR-WID, Status Report to TSG, 3rd Generation Partnership Project (3GPP), Mobile Competence Centre, 650, Route Des Lucioles, F-06921 Sophia-Antipolis Cedex, France, vol. TSG RAN, No. Sapporo, Japan, Sep. 11, 2017-Sep. 14, 2017, Sep. 6, 2017 (Sep. 6, 2017), XP051668625, 284 Pages, Retrieved from the Internet: URL: http://www.3gpp.org/ftp/tsg%5Fran/TSG%5FRAN/TSGR%5F77/Docs/RP%2D171783%2Ezip [retrieved on Sep. 6, 2017], Section: Scheduling and HARQ Aspects; p. 52-p. 63.

Qualcomm Incorporated: "Combined Downlink and Uplink NR Positioning Procedures", 3GPP Draft, 3GPP TSG-RAN WG2 Meeting #104, R2-1817899_(Positioning Procedures), 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481785, pp. 1-18, Retrieved from the Internet: URL: https://www.3gpp.org/ftp/tsg_ran/wg2_rl2/TSGR2_104/Docs/R2-1817899.zip, https://www.3gpp.org/ftp/tsg_ran/wg2_rl2/TSGR2_104/Docs/R2-1817899.zip [retrieved on Nov. 2, 2018], Paragraphs [0001]-[0003], p. 4, Figures 1-5, figure 4.

Qualcomm Incorporated: "Considerations on NR Positioning Using PRS", 3GPP Draft, R1-1811287, 3GPP TSG-RAN WG1 Meeting #94bis, (OTDOA-RTT-PRS), 3rd Generation Partnership Project (3GPP), Mobile Competence Centre, 650, Route Des Lucioles ; F-06921 Sophia-Antipolis Cedex, France, vol. RAN WG1, No. Chengdu, CN; Oct. 8, 2018-Oct. 12, 2018, Sep. 29, 2018 (Sep. 29, 2018), XP051518690, 8 Pages, Retrieved from the Internet: URL: https://www.3gpp.org/ftp/tsg_ran/WG1_RL1/TSGR1_94b/Docs/R1-1811287.zip [retrieved on Sep. 29, 2018], * chapters 2. 3.3. 3.5. 3.6. 4.

Qualcomm Incorporated: "Signalling Protocol Options for WiFi, BT and Barometric Sensor Positioning", 3GPP Draft; R2-153130, 3rd Generation Partnership Project (3GPP), Mobile Competence Centre, 650, Route Des Lucioles; F-06921 Sophia-Antipolis Cedex,

(56) References Cited

OTHER PUBLICATIONS

France, vol. RAN WG2, No. Beijing, P.R. China; Aug. 24, 2015-Aug. 28, 2015, Aug. 14, 2015 (Aug. 14, 2015), XP050991581, pp. 1-28, Retrieved from the Internet: URL: https://www.3gpp.org/ftp/tsg_ran/WG2_RL2/TSGR2_91/Docs/ [retrieved on Aug. 14, 2015], Paragraphs [04.1], [0005]; Figure 3, Paragraphs [02.1], [0003].
Taiwan Search Report—TW107145864—TIPO—Dec. 27, 2021.
Nokia, et al., "Solutions for Wider Bandwidth Options,", 3GPP Draft, 3GPP TSG-RAN WG1 Meeting #88b, R1-1703193, CarrierAggregation, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 13, 2017-Feb. 17, 2017, Feb. 12, 2017 (Feb. 12, 2017), XP051210327, 12 pages, p. 7.
Taiwan Search Report—TW111113251—TIPO—Dec. 23, 2022.
Taiwan Search Report—TW111131846—TIPO—Feb. 3, 2023.
3GPP: "3rd Generation Partnership Project, Technical Specification Group Radio Access Network, NG Radio Access Network (NG-RAN), Stage 2 functional specification of User Equipment (UE) positioning in NG-RAN (Release 16)", 3GPP TS 38.305, V16.8.0, Sep. 2022, pp. 1-121.
3GPP: "3rd Generation Partnership Project, Technical Specification Group Radio Access Network, NR, Physical layer measurements (Release 16)", 3GPP TS 38.215, V16.6.0, Mar. 2023, pp. 1-24.
ETSI: "Universal Mobile Telecommunications System (UMTS), Evaluation of the Inclusion of Path Loss Based Location Technology in the Utran (3GPP TR 25.907 version 9.0.1 Release 9)", ETSI TR 125 907, V9.0.1, Feb. 2010, pp. 1-36.
European Search Report—EP24190130—Search Authority—The Hague—Oct. 24, 2024.
Qualcomm Incorporated: "Combined Downlink and Uplink NR Positioning Procedures", R2-1817899, 3GPP TSG-RAN WG2 Meeting #104, (Positioning Procedures), 3rd Generation Partnership Project, Mobile Competence Centre, 650, Route Des Lucioles, F-06921 Sophia-Antipolis Cedex, France vol. RAN WG2, No. Spokane, USA, Nov. 12, 2018-Nov. 16, 2018, Nov. 2, 2018, XP051481785, 18 Pages, Paragraphs [001.]-[004.], Figures 1-5.
Taiwan Search Report—TW111113251—TIPO—Dec. 11, 2024.

\* cited by examiner

Let δ = Time at E2 − Time at E1

RTT = A + B
    = (Rx0 − Tx0 − δ) + (Rx1 + δ − Tx1)
    = (Rx0 − Tx0) + (Rx1 − Tx1)

Denoting (T mod 1ms) as [T] and assuming RTT < 1ms

RTT = [ RTT ]
    = [ (Rx0 − Tx0) + (Rx1 − Tx1) ]
    = [ [ (Rx0 − Tx0) ] + [ (Rx1 − Tx1) ] ]
    = [ [ ([Rx0] − [Tx0]) ] + [ ([Rx1] − [Tx1]) ] ]   (570)

For RTT calculation by E1 using Eq 570, E1 needs to be provided with Rx0 and either measure Tx1 or be provided with Tx1

SYSTEMS AND METHODS FOR MULTIPLE ROUND TRIP TIME (RTT) ESTIMATION IN WIRELESS NETWORKS

CROSS-REFERENCE TO RELATED APPLICATIONS

The present Application for Patent is a continuation of U.S. patent application Ser. No. 16/223,073, entitled "SYSTEMS AND METHODS FOR MULTIPLE ROUND TRIP TIME (RTT) ESTIMATION IN WIRELESS NETWORKS," filed Dec. 17, 2018, which claims the benefit of U.S. Provisional Application No. 62/607,899, entitled "ROUND TRIP TIME (RTT) ESTIMATION PROCEDURES," filed Dec. 19, 2017, each assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to round trip time (RTT) estimation procedures in wireless networks.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) wireless standard enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for determining multiple round-trip times (RTTs) for a user equipment (UE) performed by a master node includes sending, to the UE, during one or more predefined symbols of a downlink subframe, an RTT measurement signal on a cell supported by the master node, receiving, from the UE, information indicative of an arrival time at the UE of each of a plurality of RTT measurement signals, wherein the plurality of RTT measurement signals comprise the RTT measurement signal and a plurality of other RTT measurement signals transmitted by a plurality of other nodes;

receiving, from the UE, an RTT response signal, obtaining an arrival time at the master node of the RTT response signal, obtaining a transmission time of the RTT response signal, receiving, from the plurality of other nodes, information indicative of an RTT between the UE and each of the plurality of other nodes, and enabling determination of an RTT between the UE and the master node and between the UE and each of the plurality of other nodes based on at least one of a transmission time at the master node of the RTT measurement signal, the information indicative of the arrival time at the UE of each of the plurality of RTT measurement signals, the arrival time at the master node of the RTT response signal, the transmission time of the RTT response signal, the information indicative of the RTT between the UE and each of the plurality of other nodes, and a timing adjust parameter for the UE.

In an aspect, a method for determining multiple RTTs at a UE includes transmitting, to a plurality of base stations, an RTT measurement signal, wherein each base station of the plurality of base stations measures an arrival time of the RTT measurement signal relative to a downlink subframe timing of the each base station, receiving, from each base station of the plurality of base stations, an RTT response signal transmitted by the each base station, obtaining an arrival time at the UE for the RTT response signal received from each base station of the plurality of base stations, obtaining information for each base station of the plurality of base stations indicative of a transmission time of the RTT response signal received from the each base station and the arrival time of the RTT measurement signal measured by the each base station, and calculating an RTT between the UE and each base station of the plurality of base statins based on a transmission time at the UE of the RTT measurement signal, the arrival time at the UE for the RTT response signal received from the each base station of the plurality of base stations, the information for the each base station of the plurality of base stations indicative of the transmission time of the RTT response signal received from the each base station and the arrival time of the RTT measurement signal measured by the each base station, and a timing adjust parameter for the UE.

In an aspect, an apparatus for determining multiple RTTs for a UE includes a communication device of a master node configured to: send, to the UE, during one or more predefined symbols of a downlink subframe, an RTT measurement signal on a cell supported by the master node, receive, from the UE, information indicative of an arrival time at the UE of each of a plurality of RTT measurement signals, wherein the plurality of RTT measurement signals comprise the RTT measurement signal and a plurality of other RTT measurement signals transmitted by a plurality of other nodes, and receive, from the UE, an RTT response signal, at least one processor of the master node configured to: obtain an arrival time at the master node of the RTT response signal, and obtain a transmission time of the RTT response signal, wherein the communication device is further configured to receive, from the plurality of other nodes, information indicative of an RTT between the UE and each of the plurality of other nodes, and wherein the at least one processor is further configured to enable determination of an RTT between the UE and the master node and between the UE and each of the plurality of other nodes based on at least one of a transmission time at the master node of the RTT measurement signal, the information indicative of the arrival time at the UE of each of the plurality of RTT measurement signals, the arrival time at the master node of the RTT response signal, the transmission time of the RTT response signal, the information indicative of the RTT between the UE and each of the plurality of other nodes, and a timing adjust parameter for the UE.

In an aspect, an apparatus for determining multiple RTTs at a UE includes a transceiver of the UE configured to: transmit, to a plurality of base stations, an RTT measurement signal, wherein each base station of the plurality of base stations measures an arrival time of the RTT measurement signal relative to a downlink subframe timing of the each base station, receive, from each base station of the plurality of base stations, an RTT response signal transmitted by the each base station, and at least one processor of the UE configured to: obtain an arrival time at the UE for the RTT response signal received from each base station of the plurality of base stations, obtain information for each base station of the plurality of base stations indicative of a transmission time of the RTT response signal received from the each base station and the arrival time of the RTT measurement signal measured by the each base station, and calculate an RTT between the UE and each base station of the plurality of base statins based on a transmission time at the UE of the RTT measurement signal, the arrival time at the UE for the RTT response signal received from the each base station of the plurality of base stations, the information for the each base station of the plurality of base stations indicative of the transmission time of the RTT response signal received from the each base station and the arrival time of the RTT measurement signal measured by the each base station, and a timing adjust parameter for the UE.

In an aspect, an apparatus for determining multiple RTTs for a UE includes means for communicating of a master node configured to: send, to the UE, during one or more predefined symbols of a downlink subframe, an RTT measurement signal on a cell supported by the master node, receive, from the UE, information indicative of an arrival time at the UE of each of a plurality of RTT measurement signals, wherein the plurality of RTT measurement signals comprise the RTT measurement signal and a plurality of other RTT measurement signals transmitted by a plurality of other nodes, and receive, from the UE, an RTT response signal, and means for processing of the master node configured to: obtain an arrival time at the master node of the RTT response signal, and obtain a transmission time of the RTT response signal, wherein the means for communicating is further configured to receive, from the plurality of other nodes, information indicative of an RTT between the UE and each of the plurality of other nodes, and wherein the means for processing is further configured to enable determination of an RTT between the UE and the master node and between the UE and each of the plurality of other nodes based on at least one of a transmission time at the master node of the RTT measurement signal, the information indicative of the arrival time at the UE of each of the plurality of RTT measurement signals, the arrival time at the master node of the RTT response signal, the transmission time of the RTT response signal, the information indicative of the RTT between the UE and each of the plurality of other nodes, and a timing adjust parameter for the UE.

In an aspect, an apparatus for determining multiple RTTs at UE includes means for communicating of the UE configured to: transmit, to a plurality of base stations, an RTT measurement signal, wherein each base station of the plurality of base stations measures an arrival time of the RTT measurement signal relative to a downlink subframe timing of the each base station, receive, from each base station of the plurality of base stations, an RTT response signal transmitted by the each base station, and means for processing of the UE configured to: obtain an arrival time at the UE for the RTT response signal received from each base station of the plurality of base stations, obtain information for each base station of the plurality of base stations indicative of a transmission time of the RTT response signal received from the each base station and the arrival time of the RTT measurement signal measured by the each base station, and calculate an RTT between the UE and each base station of the plurality of base statins based on a transmission time at the UE of the RTT measurement signal, the arrival time at the UE for the RTT response signal received from the each base station of the plurality of base stations, the information for the each base station of the plurality of base stations indicative of the transmission time of the RTT response signal received from the each base station and the arrival time of the RTT measurement signal measured by the each base station, and a timing adjust parameter for the UE.

In an aspect, a non-transitory computer-readable medium storing computer-executable instructions for determining multiple RTTs for a UE includes computer-executable instructions comprising at least one instruction instructing a master node to send, to the UE, during one or more predefined symbols of a downlink subframe, an RTT measurement signal on a cell supported by the master node, at least one instruction instructing the master node to receive, from the UE, information indicative of an arrival time at the UE of each of a plurality of RTT measurement signals, wherein the plurality of RTT measurement signals comprise the RTT measurement signal and a plurality of other RTT measurement signals transmitted by a plurality of other nodes, at least one instruction instructing the master node to receive, from the UE, an RTT response signal, at least one instruction instructing the master node to obtain an arrival time at the master node of the RTT response signal, at least one instruction instructing the master node to obtain a transmission time of the RTT response signal, at least one instruction instructing the master node to receive, from the plurality of other nodes, information indicative of an RTT between the UE and each of the plurality of other nodes, and at least one instruction instructing the master node to enable determination of an RTT between the UE and the master node and between the UE and each of the plurality of other nodes based on at least one of a transmission time at the master node of the RTT measurement signal, the information indicative of the arrival time at the UE of each of the plurality of RTT measurement signals, the arrival time at the master node of the RTT response signal, the transmission time of the RTT response signal, the information indicative of the RTT between the UE and each of the plurality of other nodes, and a timing adjust parameter for the UE.

In an aspect, a non-transitory computer-readable medium storing computer-executable instructions for determining multiple RTTs at a UE includes computer-executable instructions comprising: at least one instruction instructing the UE to transmit, to a plurality of base stations, an RTT measurement signal, wherein each base station of the plurality of base stations measures an arrival time of the RTT measurement signal relative to a downlink subframe timing of the each base station, at least one instruction instructing the UE to receive, from each base station of the plurality of base stations, an RTT response signal transmitted by the each base station, at least one instruction instructing the UE to obtain an arrival time at the UE for the RTT response signal received from each base station of the plurality of base stations, at least one instruction instructing the UE to obtain information for each base station of the plurality of base stations indicative of a transmission time of the RTT response signal received from the each base station and the arrival time of the RTT measurement signal measured by the each base station, and at least one instruction instructing the UE to calculate an RTT between the UE and each base station of the plurality of base statins based on a transmission time at the UE of the RTT measurement signal, the arrival time at the UE for the RTT response signal received from the each base station of the plurality of base stations, the information for the each base station of the plurality of base stations indicative of the transmission time of the RTT response signal received from the each base station and the arrival time of the RTT measurement signal measured by the each base station, and a timing adjust parameter for the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1A:
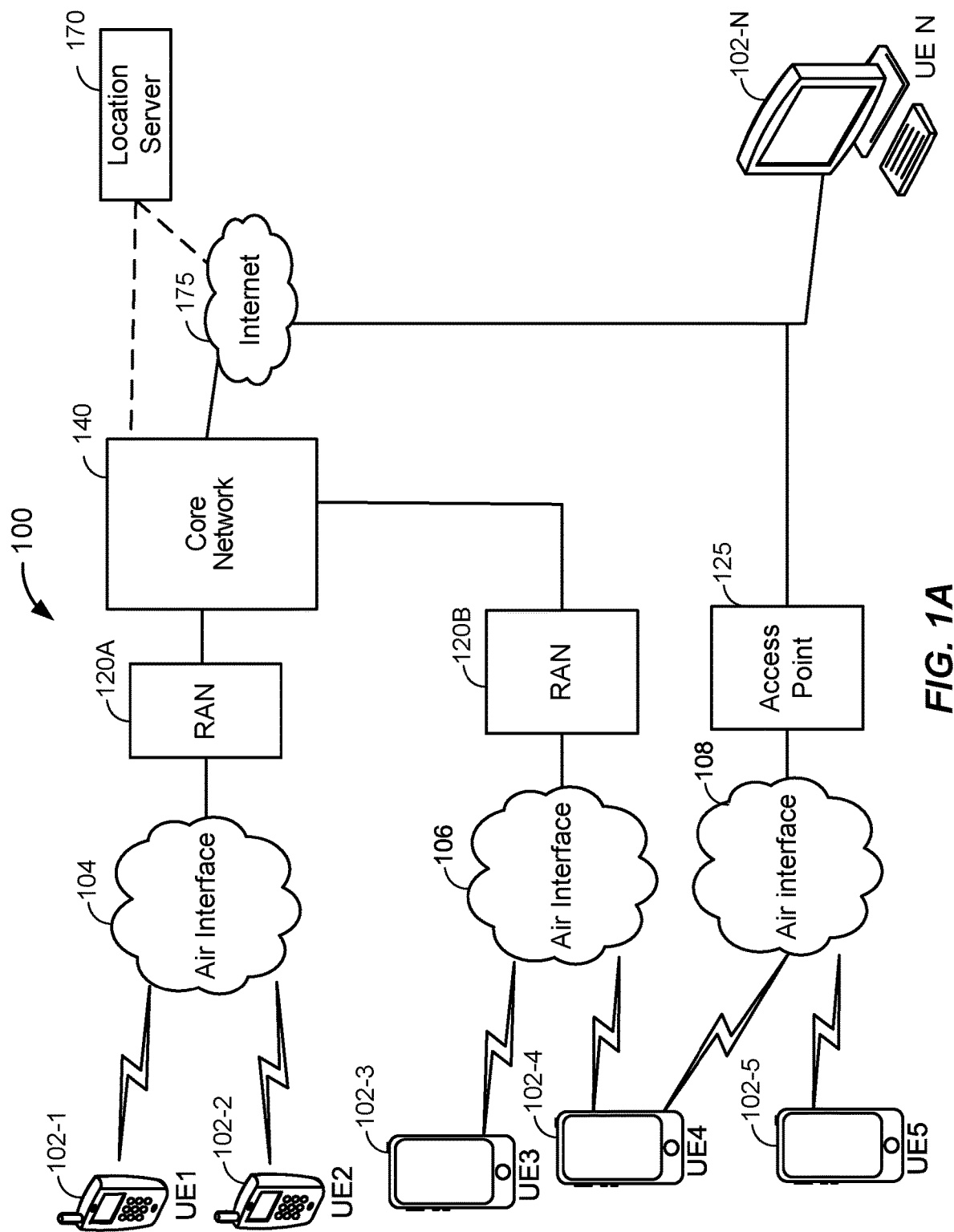
FIG. 1A illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 102-1, 102-2, 102-3, 102-4, 102-5, and 102-N of a UE are shown in FIG. 1A. A reference to a UE 102 then refers to any of UEs 102-1, 102-2, 102-3, 102-4, 102-5, and 102-N. Likewise, in FIG. 1A, any reference to a RAN 120 can refer to either RAN 120A or RAN 120B in FIG. 1A.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink channel (e.g., a reverse traffic channel, a reverse control channel, an access channel, etc.). A communication link through which the base station can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1A illustrates a high-level system architecture of a wireless communications system 100 in accordance with an aspect of the disclosure. The wireless communications system 100 contains UEs 1 to N (referenced as 102-1 to 102-N). The UEs 102-1 to 102-N can include cellular telephones, personal digital assistant (PDAs), pagers, a laptop computer, a tablet computer, a desktop computer, and so on. For example, in FIG. 1A, UE 102-1 and UE 102-2 are illustrated as cellular feature phones, UEs 102-3, 102-4, and 102-5 are illustrated as cellular touchscreen phones, or "smartphones," and UE 102-N is illustrated as a desktop computer, or personal computer (often referred to as a "PC"). Although only six UEs 102 are shown in FIG. 1A, the number of UEs 102 in wireless communications system 100 may be in the hundreds, thousands, or millions (e.g., N may be any number up to or greater than one million).

Referring to FIG. 1A, UEs 102-1 to 102-N are configured to communicate with one or more access networks (e.g., the RANs 120A and 120B, the access point 125, etc.) over a physical communications interface or layer, shown in FIG. 1A as air interfaces 104, 106, and 108 and/or a direct wired connection. The air interfaces 104 and 106 can comply with a given cellular communications protocol (e.g., Code Division Multiple Access (CDMA), Evolution-Data Optimized (E-VDO), Enhanced High Rate Packet Data (eHRPD), Global System for Mobile communications (GSM), Wideband CDMA (WCDMA), Long Term Evolution (LTE), LTE for unlicensed spectrum (LTE-U), Fifth Generation (5G) New Radio (NR), etc.), while the air interface 108 can comply with a Wireless Local Area Network (WLAN) protocol (e.g., IEEE 802.11). Both RAN 120A and 120B may include a plurality of access points that serve UEs over air interfaces, such as the air interfaces 104 and 106. The access points in the RAN 120A and 120B can be referred to as access nodes (ANs), access points (APs), base stations (BSs), Node Bs, eNodeBs, gNBs, and so on. For example, an eNodeB (also referred to as an evolved NodeB) is typically a base station that supports wireless access by UEs 102 according to the LTE wireless interface defined by The Third Generation Partnership Project (3GPP). As another example, a gNodeB, or gNB, is typically a base station that supports wireless access by UEs 102 according to the 5G NR wireless interface. These access points can be terrestrial access points (or ground stations), or satellite access points. It is noted that the terms "access point" and "base station" are used interchangeably herein.

Both RANs 120A and 120B are configured to connect to a core network 140 that can perform a variety of functions, including routing and connecting circuit switched (CS) calls between UEs 102 served by the RAN 120A/120B and other UEs 102 served by the RAN 120A/120B or UEs served by a different RAN altogether, and can also mediate an exchange of packet-switched (PS) data with external networks such as Internet 175 and external clients and servers.

The Internet 175 includes a number of routing agents and processing agents (not shown in FIG. 1A for the sake of convenience). In FIG. 1A, UE 102-N is shown as connecting to the Internet 175 directly (i.e., separate from the core network 140, such as over an Ethernet connection of WiFi or IEEE 802.11-based network). The Internet 175 can thereby function to route and connect packet-switched data communications between UE 102-N and UEs 102-1 to 102-5 via the core network 140.

Also shown in FIG. 1A is the access point 125 that is separate from the RANs 120A and 120B. The access point 125 may be connected to the Internet 175 independently of the core network 140 (e.g., via an optical communication system such as FiOS, a cable modem, etc.). The air interface 108 may serve UE 102-4 or UE 102-5 over a local wireless connection, such as IEEE 802.11 in an example. UE 102-N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1A, a location server 170 is shown as connected to the Internet 175 and the core network 140. The location server 170 can be implemented as a plurality of structurally separate servers, or alternately may correspond to a single server. As will be described below in more detail, the location server 170 is configured to support one or more location services for UEs 102 that can connect to the location server 170 via the core network 140 and/or via the Internet 175. Location server 170 may correspond to a Location Management Function (LMF) when supporting location for UEs 102 with 5G NR wireless access (e.g., where core network 140 is or includes a 5G Core Network).

An example of a protocol-specific implementation for the RANs 120A and 120B and the core network 140 is provided below with respect to FIG. 1B to help explain the wireless communications system 100 in more detail. In particular, the components of the RANs 120A and 120B and the core network 140 correspond to components associated with supporting packet-switched (PS) communications, whereby legacy circuit-switched (CS) components may also be present in these networks, but any legacy CS-specific components are not shown explicitly in FIG. 1B.

Figure 1B:
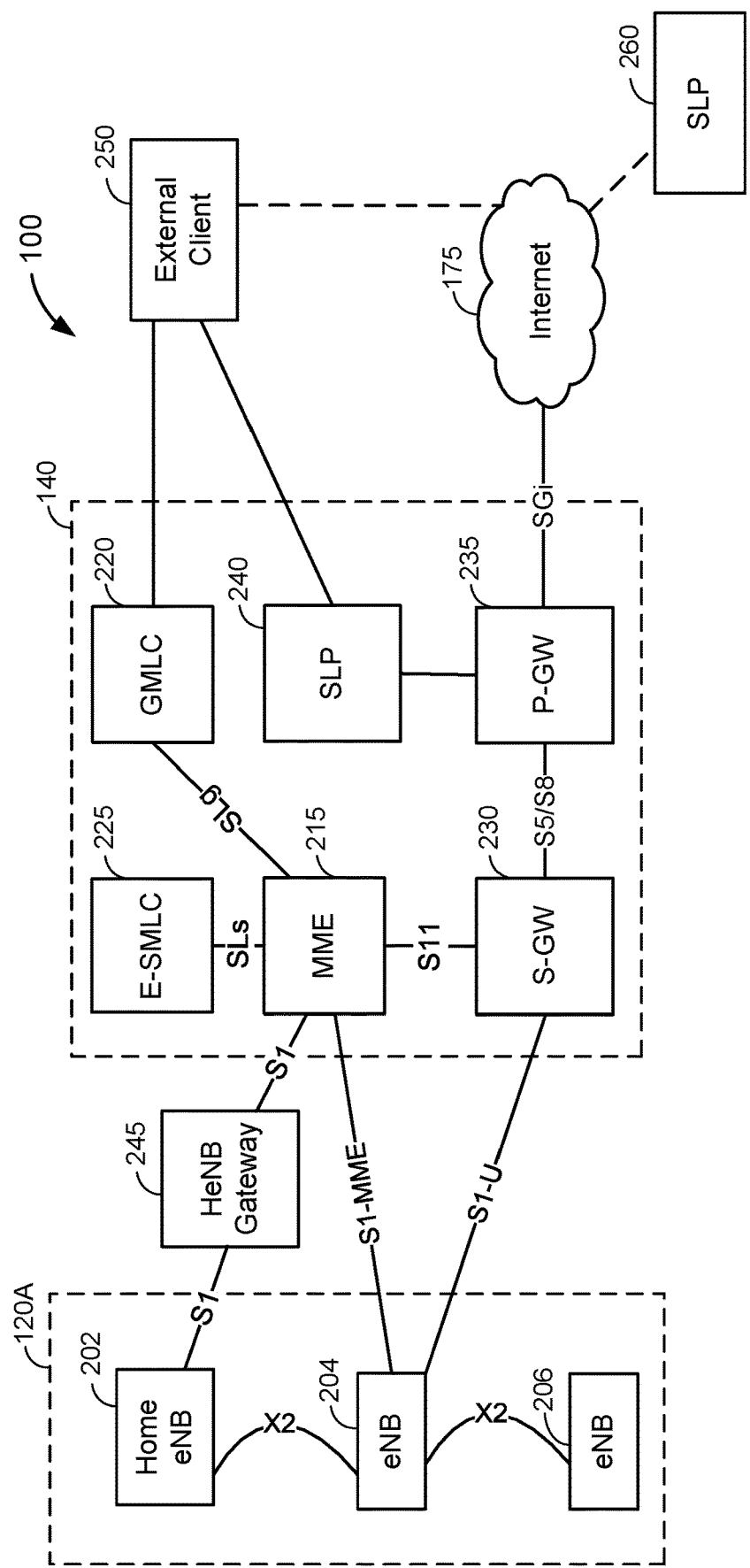
FIG. 1B illustrates an example configuration of radio access networks (RANs) and a packet-switched portion of a core network of a cellular network in accordance with an aspect of the disclosure.

FIG. 1B illustrates an example configuration of a portion of the RAN 120A and a portion of the core network 140 based on an LTE network (also referred to as an Evolved Packet System (EPS)), in accordance with an aspect of the disclosure. Referring to FIG. 1B, RAN 120A is configured with a plurality of eNBs 202, 204, and 206. In the example of FIG. 1B, eNB 202 is shown as a Home eNB (HeNB) and interfaces with the RAN 120A via a HeNB gateway 245. The HeNB 202 is an example of a "small cell base station" or "small cell." The term "small cell" generally refers to a class of low-powered base stations that may include or be otherwise referred to as femto cells, pico cells, micro cells, home base stations, Wi-Fi APs, other small coverage area APs, etc. A small cell may be deployed to supplement macro cell (e.g., eNB) coverage and/or increase network capacity. A small cell may provide wireless coverage indoors such as within a house, office, a portion of a large building, a portion of a convention center, shopping mall, etc. A small cell may instead or in addition provide wireless coverage outdoors such as over an area covering part of a block or a few blocks within a neighborhood. Small cells may communicate using unlicensed frequency bands, as opposed to macro cells, which may typically communicate using licensed frequency bands.

In FIG. 1B, the core network 140 includes an Enhanced Serving Mobile Location Center (E-SMLC) 225, a Mobility Management Entity (MME) 215, a Gateway Mobile Location Center (GMLC) 220, a Serving Gateway (S-GW) 230, a Packet Data Network Gateway (P-GW) 235, and a Secure User Plane Location (SUPL) Location Platform (SLP) 240. The functions of E-SMLC 225 may include obtaining location measurements for a UE 102 (e.g., from the UE 102 and/or from a RAN 120), computing a location for a UE 102, and/or providing assistance data to a UE 102 to enable the UE 102 to obtain location measurements and/or compute a location estimate. In the example of FIG. 1B, the location server 170 in FIG. 1A may correspond to one or more of the E-SMLC 225, the GMLC 220, the SLP 240 or an SLP 260 accessible via the Internet 175.

Network interfaces between the components of the core network 140, the RAN 120A, and the Internet 175 are illustrated in FIG. 1B and are defined in Table 1 (below) as follows:

TABLE 1

Core Network Connection Definitions

| Network Interface | Description |
| --- | --- |
| S1-MME | Reference point for the control plane protocol between RAN 120A and MME 215. |
| S1-U | Reference point between RAN 120A and S-GW 230 for the per bearer user plane tunneling and inter-eNB path switching during handover. |
| S5 | Provides user plane tunneling and tunnel management between S-GW 230 and P-GW 235. It is used for S-GW relocation due to UE mobility and if the S-GW 230 needs to connect to a non-collocated P-GW for the required PDN connectivity. |

TABLE 1-continued

Core Network Connection Definitions

| Network Interface | Description |
| --- | --- |
| S8 | Inter-PLMN reference point providing user and control plane between the S-GW 230 in a Visited Public Land Mobile Network (VPLMN) and the P-GW 235 in a Home Public Land Mobile Network (HPLMN). S8 is the inter-PLMN variant of S5. P-GW 235 is shown as being in the same Public Land Mobile Network (PLMN) as S-GW 230 in FIG. 1B so only the S5 interface may apply in FIG. 1B. But the S8 interface would apply if P-GW 235 was located in a different PLMN. |
| S11 | Reference point between MME 215 and S-GW 230. |
| SGi | Reference point between the P-GW 235 and a packet data network (PDN), shown in FIG. 1B as the Internet 175. The PDN may be an operator external public or private packet data network or an intra-operator packet data network (e.g., for provision of IMS services). This reference point corresponds to Gi for 3GPP accesses. |
| X2 | Reference point between two different eNBs used for UE handoffs. |

A high-level description of some of the components shown in the RANs 120A and 120B and the core network 140 of FIG. 1B is now provided. However, these components are each well-known in the art from various 3GPP and Open Mobile Alliance (OMA) Technical Specifications (TSs), and the description contained herein is not intended to be an exhaustive description of all functionalities performed by these components.

Referring to FIG. 1B, the MME 215 is configured to manage the control plane signaling for the Evolved Packet System (EPS). MME functions include: Non-Access Stratum (NAS) signaling, NAS signaling security, Mobility management for UEs 102 including support for inter-RAN and intra-RAN handovers, P-GW and S-GW selection, and MME selection for handovers with a change of MME.

The S-GW 230 is the gateway that terminates the user plane interface toward the RAN 120A. For each UE 102 attached to the core network 140 for an LTE-based system, at a given point of time, there can be a single S-GW 230. The functions of the S-GW 230 include: serving as a mobility anchor point, packet routing and forwarding, and setting the Differentiated Services Code Point (DSCP) based on a Quality of Service (QoS) Class Identifier (QCI) of an associated EPS bearer.

The P-GW 235 is the gateway that terminates the SGi interface toward the Packet Data Network (PDN), e.g., the Internet 175. If a UE 102 is accessing multiple PDNs, there may be more than one P-GW 235 for that UE 102. P-GW 235 functions include: providing PDN connectivity to UEs 102, UE IP address allocation, setting the DSCP based on the QCI of the associated EPS bearer, accounting for inter operator charging, uplink (UL) and downlink (DL) bearer binding, and UL bearer binding verification.

As further illustrated in FIG. 1B, an external client 250 may be connected to the core network 140 via the GMLC 220 and/or the SLP 240. The external client 250 may optionally be connected to the core network 140 and/or the SLP 260 via the Internet 175. The external client 250 may be a server, a web server, or a user device, such as a personal computer, a UE, etc.

The HeNB Gateway 245 in FIG. 1B may be used to support connection of small cells and/or HeNBs, such as HeNB 202. HeNB Gateway 245 may include or be connected to a Security Gateway (not shown in FIG. 1B). The Security Gateway may help authenticate the small cells and/or HeNBs, such as HeNB 202, and/or may enable secure communication between the small cells and/or HeNBs, such as HeNB 202, and other network entities, such as MME 215. The HeNB Gateway 245 may perform protocol relaying and conversion in order to allow small cells and/or HeNBs, such as HeNB 202, to communicate with other entities, such as MME 215.

The GMLC 220 may be a location server that enables an external client, such as external 250, to request and obtain a location estimate for a UE 102. Functions of the GMLC 220 may include authenticating and authorizing an external client 250 and requesting and obtaining a location estimate for a UE 102 from the MME 215 on behalf of the external client 250.

The SLP 240 and SLP 260 may support the Secure User Plane Location (SUPL) location solution defined by the Open Mobile Alliance (OMA), which is a user plane (UP) location solution. With a UP location solution, signaling to initiate and perform positioning of a UE 102 may be transferred using interfaces and protocols that support transfer of data (and possibly voice and other media). With the SUPL UP location solution, the location server may include or take the form of a SUPL Location Platform (SLP), such as SLP 240 or SLP 260. In FIG. 1B, either or both of SLPs 240 and 260 may be a Home SLP (H-SLP) for one or more of UEs 102, an emergency SLP (E-SLP), and/or a Discovered SLP (D-SLP). The functions of the SLPs 240 and 260 may include some or all of the functions described previously for both the E-SMLC 225 and the GMLC 220.

A network for providing 5G NR wireless access to UEs 102 may be similar to the example wireless communications system 100 described above for FIG. 1B but may also have certain differences. Specifically, in a 5G network: the eNBs 204 and 206 and the HeNB 202 may each be replaced by a gNB that provides NR wireless access to UEs 102; the HeNB Gateway 245 may not be present; MME 215 may be replaced by an Access and Mobility Management Function (AMF) that connects to the gNBs and by a Session Management Function (SMF) that connects to the AMF, which together perform functions similar to MME 215; S-GW 230 and P-GW 235 may both be replaced by a User Plane Function (UPF) that performs functions similar to those performed by both S-GW 230 and P-GW 235; E-SMLC 225 may be replaced by an LMF that performs functions similar to or the same as E-SMLC 225; and GMLC 220 may remain and continue to perform the same or similar functions to those described previously. Different 5G core functionality (e.g., location management function, access and mobility function, security anchor function, session management function, authentication server function, and so on) may be implemented in a somewhat distributed manner, with some functionality performed by the same network device and some by different network devices, and may be implemented in different network devices when compared to the implementation of similar functions in a 4G core network.

Figure 2:
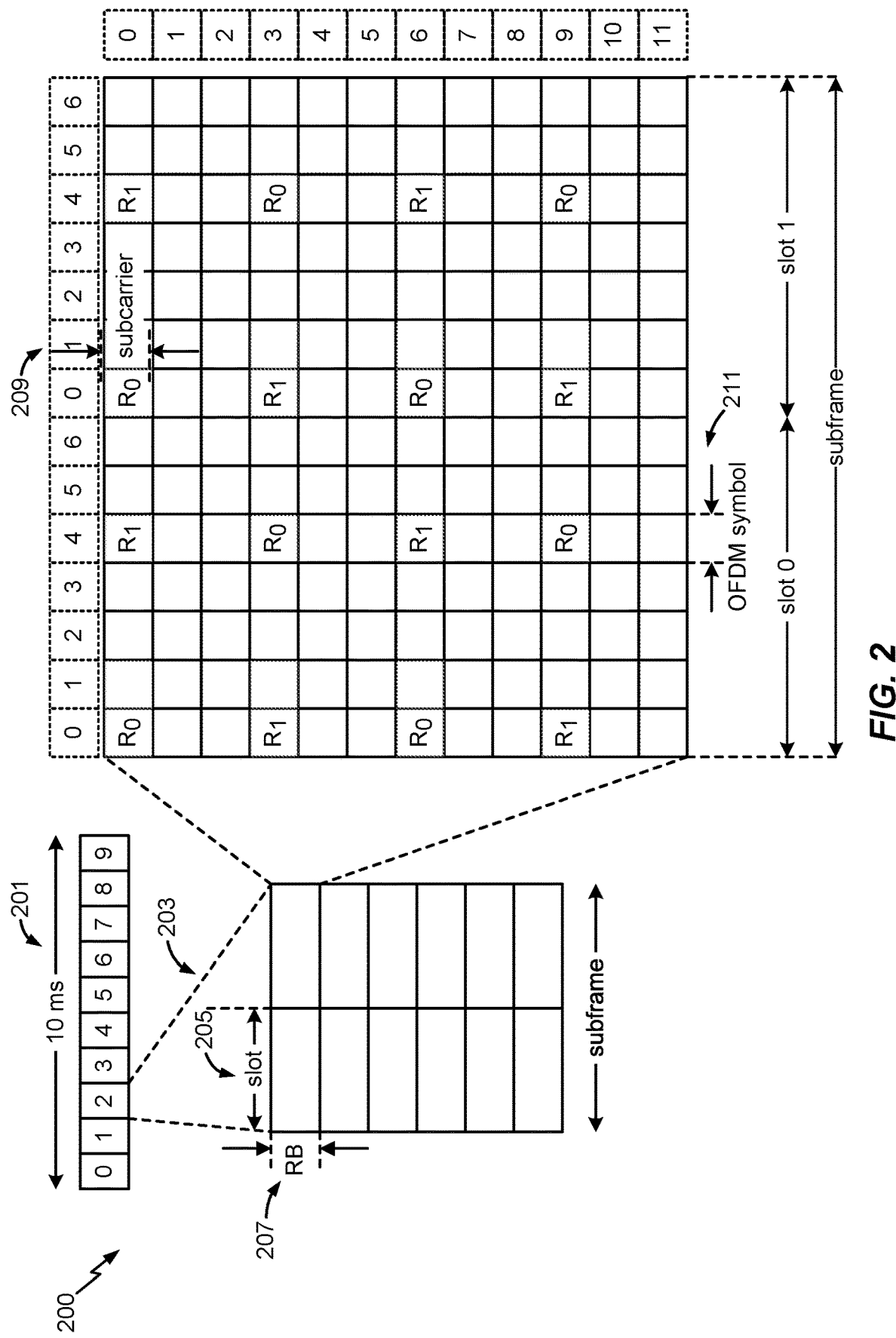
FIG. 2 is a diagram illustrating an example of a frame structure for use in a wireless telecommunications system according to an aspect of the disclosure.

Time intervals of a communications resource in LTE or 5G NR may be organized according to radio frames. FIG. 2 illustrates an example of a downlink radio frame structure 200 according to an aspect of the disclosure. However, as those skilled in the art will readily appreciate, the frame structure for any particular application may be different depending on any number of factors. In this example, a frame 201 (10 ms) is divided into 10 equally sized sub-frames 203 (1 ms). Each sub-frame 203 includes two consecutive time slots 205 (0.5 ms).

A resource grid may be used to represent two time slots 205, each time slot 205 including a resource block 207. The resource grid is divided into multiple resource elements. In LTE, and in some cases 5G NR, a resource block contains 12 consecutive subcarriers 209 in the frequency domain and, for a normal cyclic prefix in each OFDM symbol 211, 7 consecutive OFDM symbols 211 in the time domain, or 84 resource elements. Some of the resource elements, as indicated as $R_0$ and $R_1$, include a downlink reference signal (DL-RS). The DL-RS include Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element depends on the modulation scheme. Thus, the more resource blocks 207 that a UE receives and the higher the modulation scheme, the higher the data rate for the UE.

LTE, and in some cases 5G NR, utilizes OFDM on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 3:
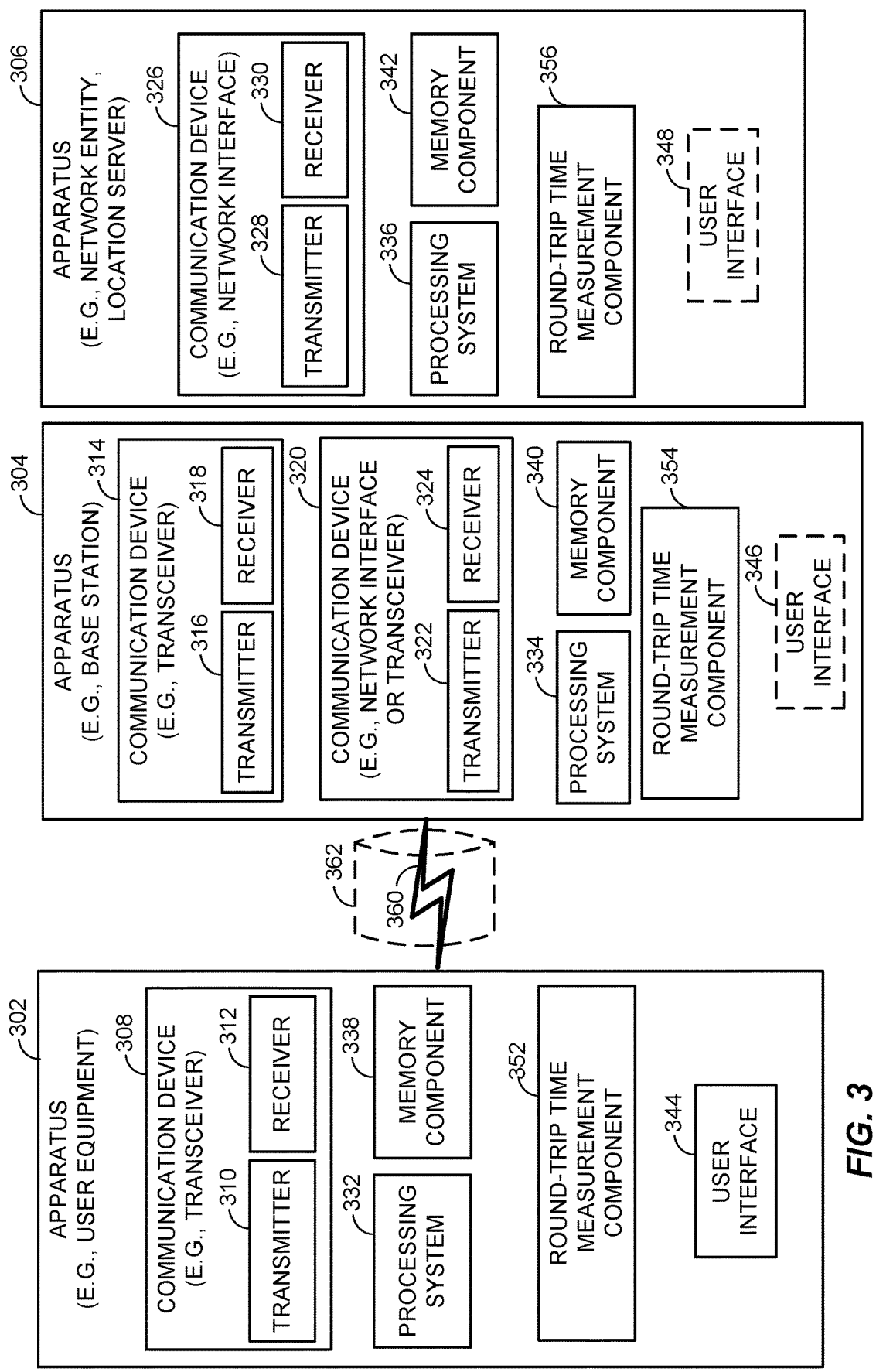
FIG. 3 is a simplified block diagram of several sample aspects of components that may be employed in wireless communication nodes and configured to support communication as taught herein.

FIG. 3 illustrates several sample components (represented by corresponding blocks) that may be incorporated into an apparatus 302, an apparatus 304, and an apparatus 306 (corresponding to, for example, a UE, a base station (e.g., a gNB), and a network entity or location server, respectively) to support the operations as disclosed herein. As an example, the apparatus 302 may correspond to a UE 102, the apparatus 304 may correspond to any of eNBs 202-206 or gNBs, and the apparatus 306 may correspond to the E-SMLC 225, SLP 240, SLP 260, GMLC 220 or an LMF. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 each include at least one wireless communication device (represented by the communication devices 308 and 314) for communicating with other nodes via at least one designated RAT (e.g., LTE, 5G NR). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by the communication device 320 and the communication device 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 also include other components that may be used in conjunction with the operations as disclosed herein. The apparatus 302 includes a processing system 332 for providing functionality relating to, for example, RTT measurements in a licensed or unlicensed frequency band as disclosed herein and for providing other processing functionality. The apparatus 304 includes a processing system 334 for providing functionality relating to, for example, RTT measurements in a licensed or unlicensed frequency band as disclosed herein and for providing other processing functionality. The apparatus 306 includes a processing system 336 for providing functionality relating to, for example, RTT measurements in a licensed or unlicensed frequency band as disclosed herein and for providing other processing functionality. In an aspect, the processing systems 332, 334, and 336 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory components 338, 340, and 342 (e.g., each including a memory device), respectively, for maintaining information (e.g., information indicative of reserved resources, thresholds, parameters, and so on). In addition, the apparatuses 302, 304, and 306 include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home eNB, such as Home eNB 202 in FIG. 1B. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with (an)other RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE-U" or "MuLTE-Fire."

Apparatus 302 may also include an RTT measurement component 352 that may be used to obtain location related measurements of signals (e.g., RTT or other signals) transmitted by a base station or AP (e.g., any of eNBs 202-206 or gNBs 502 and 622-626) according to techniques described herein. Location related measurements may include measurements of signal propagation time or RTT between a UE 102 and a base station or AP, such as any of eNBs 202-206 and gNBs 502, 622-626.

Apparatus 304 and 306 may each include an RTT measurement component 354 and 356, respectively, which may be used to determine a location estimate for a UE 102 (e.g., apparatus 302), according to techniques described herein, based on location related measurements provided by the UE 102 and/or by a base station or AP, such as any of eNBs 202-206 or a gNB. Location related measurements obtained by the UE 102 may include measurements of signal propagation time or RTT between a UE 102 and a base station or AP, such as any of eNBs 202-206 or a gNB. Location related measurements obtained by any of eNBs 202-206 (e.g., apparatus 304) may include measurements of signal propagation time or RTT between the UE 102 and a base station or AP, such as any of eNBs 202-206 or a gNB.

Figure 4:
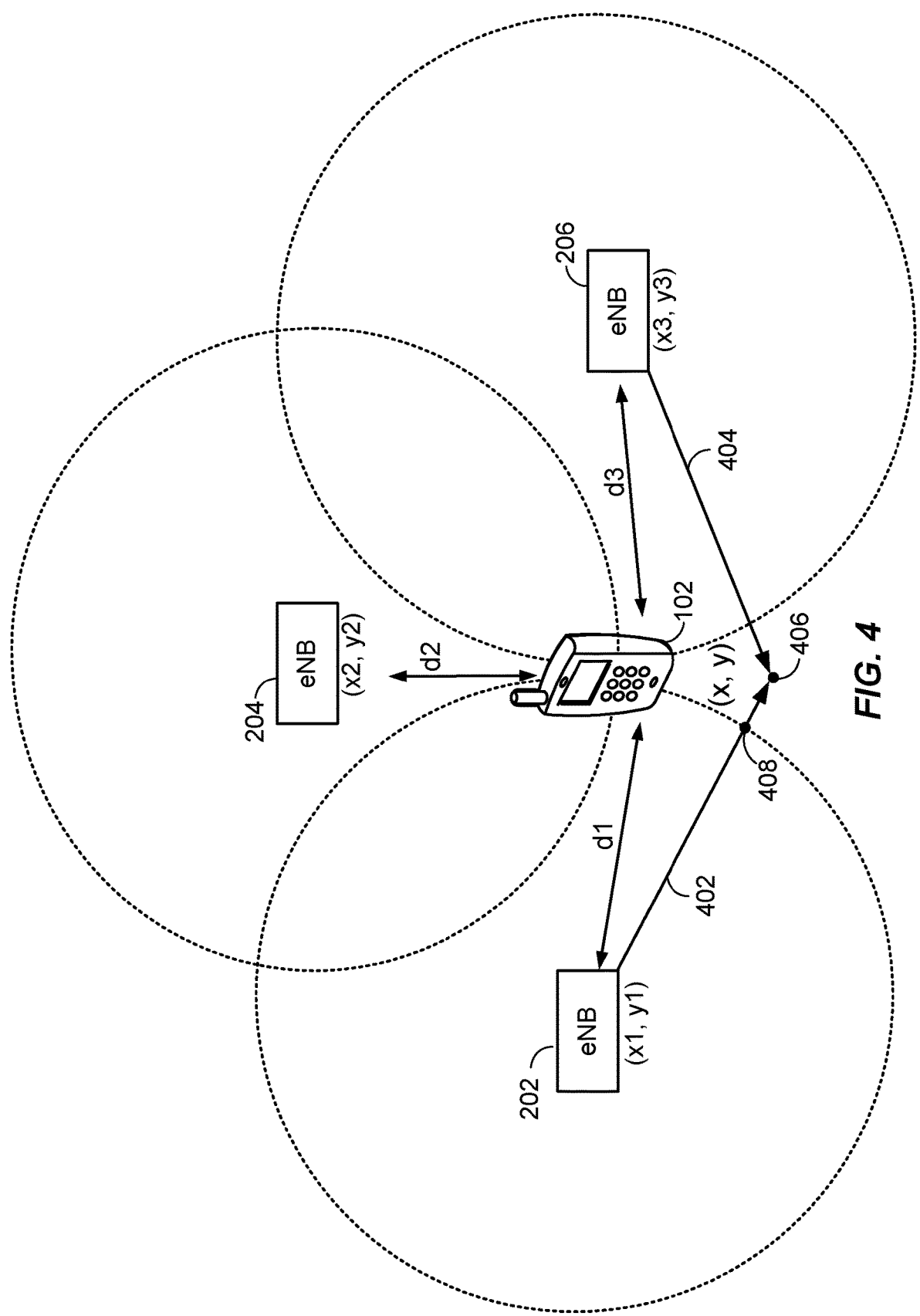
FIG. 4 is a diagram illustrating an exemplary technique for determining a position of a mobile station using information obtained from a plurality of base stations.

A simplified environment is shown in FIG. 4 for illustrating an exemplary technique for determining a position of a UE 102. The UE 102 may communicate wirelessly with a plurality of eNBs 202-206 using radio frequency (RF) signals and standardized protocols for the modulation of the RF signals and the exchanging of information packets. By extracting different types of information from the exchanged signals, and utilizing the layout of the network (i.e., the network geometry), the UE 102 may determine its position in a predefined reference coordinate system. As shown in FIG. 4, the UE 102 may specify its position (x, y) using a two-dimensional coordinate system; however, the aspects disclosed herein are not so limited, and may also be applicable to determining positions using a three-dimensional coordinate system, if the extra dimension is desired. Additionally, while three eNBs 202-206 are shown in FIG. 4, aspects may utilize additional eNBs.

In order to determine its position (x, y), the UE 102 may first need to determine the network geometry. The network geometry can include the positions of each of the eNBs 202-206 in a reference coordinate system $((x_k, y_k)$, where k=1, 2, 3). The network geometry may be provided to the UE 102 in any manner, such as, for example, providing this information in beacon signals, providing the information using a dedicated server external on an external network, providing the information using uniform resource identifiers, etc.

The UE 102 may then determine a distance ($d_k$, where k=1, 2, 3) to each of the eNBs 202-206. As will be described in more detail below, there are a number of different approaches for estimating these distances ($d_k$) by exploiting different characteristics of the RF signals exchanged between the UE 102 and eNBs 202-206. Such characteristics may include, as will be discussed below, the round trip propagation time of the signals, and/or the strength of the signals (RSSI).

In other aspects, the distances ($d_k$) may in part be determined or refined using other sources of information that are not associated with the eNBs 202-206. For example, other positioning systems, such as GPS, may be used to provide a rough estimate of $d_k$. (Note that it is likely that GPS may have insufficient signal strength in the anticipated operating environments (indoors, metropolitan, etc.) to provide a consistently accurate estimate of $d_k$. However, GPS signals may be combined with other information to assist in the position determination process.) Other relative positioning devices may reside in the UE 102 that can be used as a basis to provide rough estimates of relative position and/or direction (e.g., on-board accelerometers).

Once each distance is determined, the UE 102 can then solve for its position (x, y) by using a variety of known geometric techniques, such as, for example, trilateration. From FIG. 4, it can be seen that the position of the UE 102 ideally lies at the common intersection of all of the circles drawn using dotted lines. Each circle being defined by radius $d_k$ and center ($x_k$, $y_k$), where k=1, 2, 3. In practice, the intersection of these circles may not lie at a single point due to the noise and other errors in the networking system.

Determining the distance between the UE 102 and each eNB 202-206 may involve exploiting time information of the RF signals. In an aspect, determining the RTT of signals exchanged between the UE 102 and any eNB 202-206 can be performed and converted to a distance ($d_k$). RTT techniques can measure the time between sending a signaling message and receiving a response. These methods may utilize calibration to remove any processing delays. In some environments, it may be assumed that the processing delays for the UE 102 and the eNBs 202-206 are the same. However, such an assumption may not be true in practice.

In a variation of the technique shown in FIG. 4, each of the eNBs 202-206 may be replaced by a gNB. In this variation, the principles of the technique may remain as described previously, with the UE 102 being located at the common intersection of circles, and with each circle centered on one of the gNBs and with a radius obtained from a measurement of an RTT between the UE 102 and the gNB.

In some instances (e.g., as described later for FIG. 8), additional information may be obtained in the form of an Angle of Arrival (AOD) or Angle of Departure (AOD) that defines a straight line direction (e.g., which may be in a horizontal plane or in three dimensions) or possibly a range of directions (e.g., for the UE 102 from the location of a gNB or eNB). Two such exemplary straight line directions 402 and 404 from eNBs 202 and 206, respectively, are illustrated in FIG. 4. The intersection of the two directions 402 and 404 at the point 406 can provide another estimate of the location for the UE 102. Additionally, the intersection of a direction from an eNB or gNB with a circle (or sphere) around that eNB or gNB or around another eNB or gNB (e.g., as defined by an RTT for that eNB or gNB) can provide another estimate of the location for the UE 102. For example, the point 408 in FIG. 4 illustrates an intersection of the direction 402 with the circle (or sphere) around eNB 202. The location estimates provided by directions from gNBs or eNBs may be further combined with location estimates provided by RTTs to improve a location estimate for the UE 102, as is well known in the art.

A position estimate (e.g., for a UE 102) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5A:
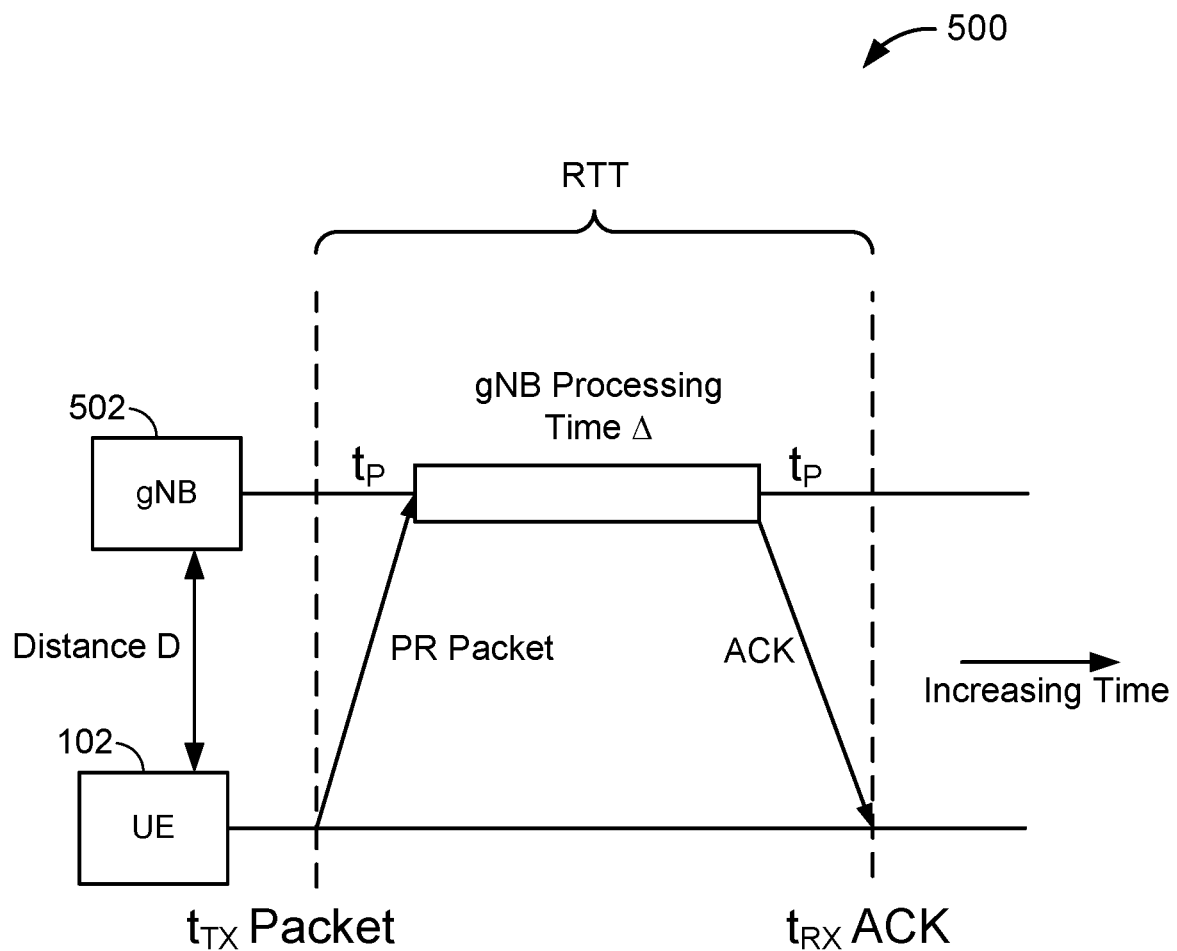
FIGS. 5A and 5B are diagrams showing exemplary timings within an RTT procedure, occurring during a wireless probe request and a response.

FIG. 5A is a diagram 500 showing exemplary timings within an RTT measurement occurring during a wireless probe request and a response. In an aspect, the response may take the form of an acknowledgement packet (ACK); however, any type of response packet would be consistent with various aspects of the disclosure. For example, a Request to Send (RTS) transmit packet and/or Clear to Send (CTS) response packet may be suitable. FIG. 5A is illustrated using a gNB 502, though any of eNBs 202-206 could replace gNB 502 in FIG. 5A without changing the measurement procedure.

To measure the RTT with respect to a given gNB 502, the UE 102 may send a directed probe request (PR) packet to the gNB 502 and record the time (timestamp) at which the probe request packet was sent ("$t_{TX}$ Packet") as shown on the UE 102 timeline in FIG. 5A. After a propagation time $t_P$ of the probe request packet between the UE 102 and the gNB 502, the gNB 502 will receive the packet (assuming Line of Sight (LOS) propagation). The gNB 502 may then process the directed probe request packet and may send an ACK back to the UE 102 after some processing time Δ as shown on the gNB 502 timeline in FIG. 5A. After a second propagation time $t_p$, the UE 102 may record the time (timestamp) at which the ACK packet was received ("$t_{RX}$ ACK") as shown on the UE 102 time line. The UE 102 may then determine the RTT as the time difference $t_{RX}$ ACK-$t_{TX}$ Packet. However, an RTT obtained in this way may include an error component due to the processing time Δ, which may not always be accurately known. A distance D between the UE 102 and gNB 502 can be obtained as (RTT/c), where c is the radio signal propagation speed (typically the speed of the light). The distance D can then be used to determine a circle or sphere around the gNB 502 (e.g., as in FIG. 4) on which the UE 102 can be located.

Position location methods, such as Observed Time Difference of Arrival (OTDOA), currently used in cellular networks typically require fine (e.g., sub-microsecond) synchronization of timing across base-stations in the network. On the other hand, RTT-based methods may only need coarse timing synchronization (e.g., within a cyclic prefix (CP) duration of the Orthogonal Frequency-Division Multiplexing (OFDM) symbols). The present disclosure describes procedures that can be implemented in a 5G NR network, exploiting its self-contained subframe structure (which enables a transmission and an ACK/NACK in the same subframe), and avoiding the need for fine synchronization of base stations.

In 5G NR, there is no requirement for precise timing synchronization across the network. Instead, it is sufficient to have (coarse) CP-level time-synchronization across gNBs. Coarse time-synchronization enables low-reuse of RTT Measurement signals, which mitigates intercell interference. Intercell interference mitigation ensures deep penetration of RTT signals, which enables multiple independent timing measurements across distinct gNBs, and hence more accurate positioning.

In a network-centric RTT estimation, the serving gNB instructs the UE (e.g., UE 102) to scan for/receive RTT Measurement signals from one or more neighboring gNBs (and typically the serving gNB). The one or more gNBs transmit RTT Measurement signals on low reuse resources (i.e., resources used by the base station to transmit system information), allocated by the network (e.g., location server 170). The UE records the arrival time (also referred to as a receive time, a reception time, a time of reception, or a time of arrival) of each RTT Measurement signal relative to the UE's current downlink timing (e.g., as derived by the UE from a DL signal received from its serving gNB), and transmits a common or individual RTT Response message(s) to the one or more gNBs (e.g., when instructed by its serving gNB) and may include each of the measured arrival times in a payload of the RTT Response message(s).

A UE-centric RTT estimation is similar to the network-based method, except that the UE (e.g., UE 102) transmits uplink RTT Measurement signal(s) (e.g., when instructed by a serving gNB), which are received by multiple gNBs in the neighborhood of the UE. Each gNB responds with a downlink RTT Response message, which may include the arrival time of the RTT Measurement signal at the gNB in the RTT Response message payload.

For both network-centric and UE-centric procedures, the side (network or UE) that performs the RTT calculation typically (though not always) transmits the first message(s) or signal(s) (e.g., RTT Measurement signal(s)), while the other side responds with one or more RTT Response messages or signal(s) that may include the arrival (or receive) time(s) of the first message(s) or signal(s) in the RTT Response message(s) payload.

Figure 5B:
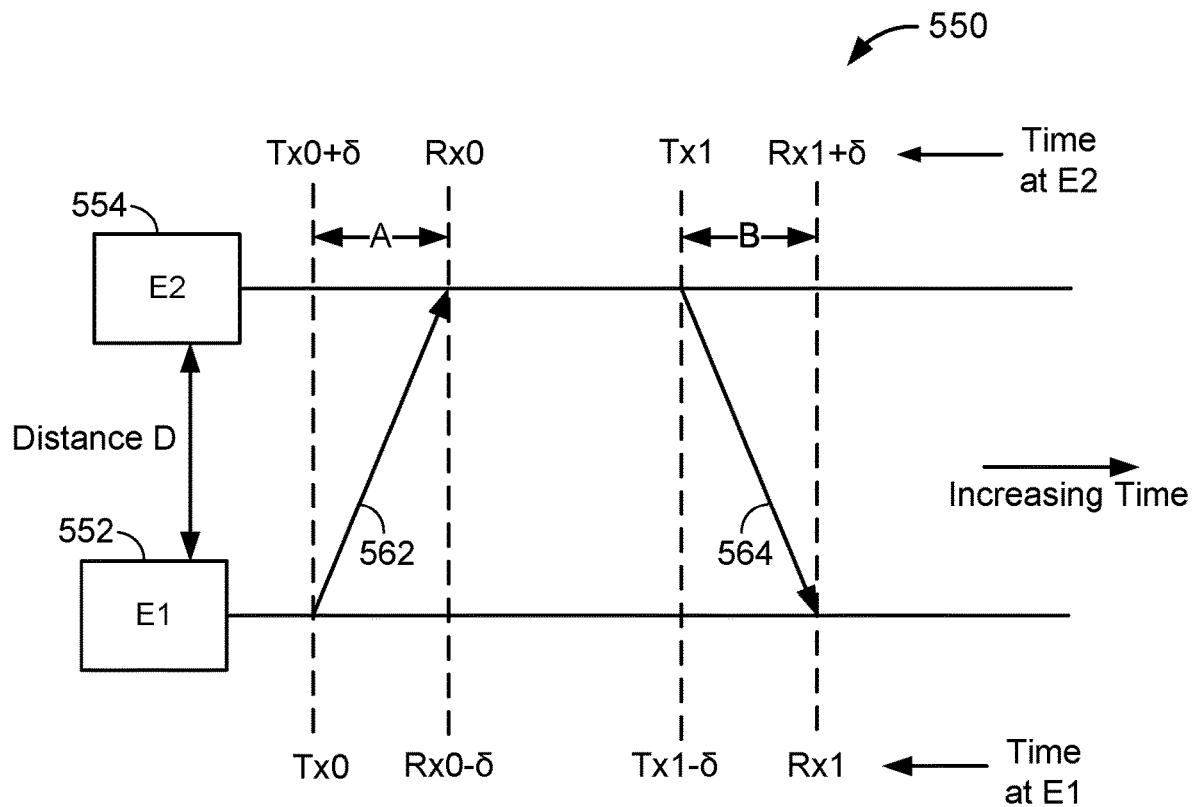

FIG. 5B is a diagram 550 showing exemplary timings within an RTT measurement occurring during a wireless probe request and a response, where RTT calculation can be more precise than in FIG. 5A. In FIG. 5B, entity E1 552 corresponds to either a UE (e.g., UE 102) or a gNB (e.g., gNB 502), while entity E2 554 corresponds to the other of the UE and the gNB. For network-centric RTT estimation, E1 552 may correspond to the gNB and E2 554 may correspond to the UE. For UE-centric RTT estimation, E1 552 may correspond to the UE and E2 554 may correspond to the gNB. In FIG. 5B, a straight line distance D between E1 552 and E2 554 is represented vertically, while time is represented horizontally with time increasing from left to right. Transmission and reception times at E1 552 are show at the bottom of diagram 550, while transmission and reception times at E2 554 are shown at the top of diagram 550. In the case of a gNB, transmission and reception timing will normally be identical. In the case of a UE, transmission timing will normally lead (i.e. exceed) reception timing by an amount known as a "timing advance" or "timing adjust," commonly abbreviated as TA, in order for UE transmission timing to approximately coincide with gNB reception timing from the perspective of a serving gNB or to arrive at the serving gNB at some other preferred time. In order to compensate for this difference, a known value for TA can be subtracted from any transmission time for the UE, as shown in more detail below.

Timing at E2 554 in FIG. 5B is assumed to be an amount δ ahead of timing at E1 552 (though can be behind timing at E1 552 if δ is negative). This assumption allows for both synchronized networks (e.g., where δ may be zero) and unsynchronized or asynchronous networks, where δ may have any value. E1 552 is assumed to transmit an RTT measurement signal (or message) 562 at time Tx0 at E1 552 (and thus at time Tx0+δ at E2 554), which is received at E2

554 at time Rx0 at E2 554 (and thus at time Rx0−δ at E1 552). Sometime later, E2 554 transmits an RTT Response message or signal 564 at time Tx1 at E2 554 (and thus at time Tx1−δ at E1 552), which is received at E1 552 at time Rx1 (and thus at time Rx1+δ at E2 554). The equations below diagram 550 assume that compensation for any TA has already occurred, and show how the RTT can be obtained from the transmission and reception times Tx0, Rx0, Tx1 and Rx1, based on well known rules for modulo arithmetic. In particular, provided RTT is less than 1 millisecond (ms) (which would mean a distance D between the UE and gNB that is less than 150 kilometers, which may be very likely in any 5G network), it can be possible to measure the transmission and arrival times relative to 1 ms NR subframe timing by using values that are modulo 1 ms. This may simplify measurements as it may not be necessary to measure, record or transfer integer multiples of 1 ms.

Entity E1 552 in FIG. 5B (or some other entity to which E1 552 forwards its measurements) can determine the RTT from Equation 570 in FIG. 5B using the measured values for Tx0 and Rx1 and values for Rx0 and Tx1. The values for Rx0 and Tx1 can be obtained by E1 552 according to one of four alternative variants, labelled here as V1, V2, V3 and V4. In variant V1, entity E2 554 includes the measured value for Rx0 in the payload of the RTT response 564 and entity E1 552 measures the transmission time Tx1 from the NR subframe and radio frame structure for the RTT response 564. Entity E1 552 can then determine the RTT (e.g., using Equation 570) from the known values of Rx0, Rx1, Tx0 and Tx1. Variant V1 may require that entity E1 552 can both demodulate and decode the RTT Response 564 (in order to measure Tx1 and obtain Rx0 from the payload). However, this may not always be possible if entities E1 552 and E2 554 are distant from one another (e.g., for a UE 5 kms or more distant from an outdoor gNB in an urban or suburban environment) or if there is strong interference at E1 552 from other radio sources (e.g., other UEs and/or gNBs). In contrast, with variants V2, V3 and V4 (described below), E1 552 may not always need to demodulate and decode the RTT Response 564 (e.g., may only need to demodulate the RTT Response 564 sufficiently to measure the arrival time Rx1), which may enable measurement of weaker signals and/or signals subject to interference.

With variant V2, the times Rx0 and Tx1 at E2 554 (or values indicative of the times Rx0 and Tx1 such as (Rx0−Tx1)) are sent in a separate message (e.g., an RRC message) from the UE to a serving gNB when E2 554 is the UE or from the serving gNB to the UE when E2 554 is a gNB. The serving gNB for the UE can further send or receive the values for Rx0 and Tx1 (or the values indicative of Rx0 and Tx1) to or from, respectively, the gNB for which RTT is to be obtained when this gNB is not the serving gNB. While variant V2 ensures correct transfer of Rx0 and Tx1, the additional separate message may add extra delay as well as require more signaling.

With variant V3, which may only apply when E2 554 is the UE, the UE includes the measurement Rx0 in the payload of the RTT Response 564 and the serving gNB for the UE, but not other gNBs, demodulates and decodes the RTT Response 564 to obtain the Rx0 measurement and measures Tx1. The serving gNB can then forward the Rx0 and Tx1 values to the gNB for which RTT is being measured, if needed.

With variant V4, which may also only apply when E2 554 is the UE, E1 552 (which is the gNB), or a serving gNB for the UE when E1 552 is not the serving gNB for the UE, sends a required value for Tx1 to the UE in advance (e.g., which can be adjusted to either include or exclude the TA), which means the gNB (or the serving gNB) knows in advance the value for Tx1. E1 552 (or the serving gNB) can use a separate message to send the value of Tx1 or can include Tx1 in the payload for the RTT Measurement message (or signal) 562. With variant V4, the value for Rx0 can be sent by the UE in the payload for the RTT Response 564 or in a separate message. Part of variant V4 can also be used when E1 552 is the UE to send a required value for Tx0 to the UE in a separate message prior to the transmission of the RTT Measurement message (or signal) 562 by the UE. By knowing the value of Tx1 or Tx0 in advance, using variant V4, the gNB may be able to more accurately measure Rx1 or Rx0, respectively, due to knowing approximately when the RTT message or signal (562 or 564) from the UE will arrive. The gNB can also indicate to the UE in advance the intended value of Tx0 or Tx1 at the gNB, which may help improve UE measurement of Rx0 or Rx1, respectively.

The RTT procedure, as described above for FIG. 5B, can be used between a UE and multiple gNBs—e.g., a serving gNB for the UE and one or more neighboring gNBs—to enable a determination of multiple RTTs. To improve the efficiency of signaling for multiple gNBs and reduce the number of separate measurements, the RTT Measurement message or signal 562 when E1 552 is the UE, or the RTT Response message or signal 564 when E2 554 is the UE, can be sent once only and measured by all the participating gNBs. In this case, the transmission time for this single RTT message or signal (which will be Tx0 or Tx1) only needs to be provided or measured once (e.g., measured by just the serving gNB or sent to just the serving gNB by the UE). In addition, for variants V1 and V3, the UE can include the Rx0 values for all gNBs in the payload of the RTT Response signal 564 when E2 554 is the UE. Alternatively, the serving gNB can send the Rx0 values for all gNBs (and optionally the transmission times Tx1 for all gNBs) to the UE in a single message (after transmission of the RTT Responses 564) when E1 552 is the UE. To optimize transfer of the values of both Rx0 and Tx1 in a separate message, only the values for (Rx0−Tx1) (modulo 1 ms) need be sent, as can be seen in Equation 570.

For network-centric estimation of RTT where E2 552 is a gNB, the RTT calculation for a non-serving gNB may only be performed at the non-serving gNB when variant V1 is used. For other variants (V2-V4) and in some cases for variant V1, a non-serving gNB may transfer information indicative of the RTT (e.g., the values of Tx0 and Rx1 or a single value for (Rx1−Tx0)) to another entity such as the serving gNB for the UE or a location server, which may then compute the RTT or may transfer the information to a further entity (e.g., a location server) where the RTT computation may occur. The entity that performs the RTT calculation (or receives calculated RTTs) can further obtain a location for the UE—e.g., as described for FIG. 4.

To compensate for the TA value (which was assumed to have already occurred in the equations shown in FIG. 5B), when E1 552 is the UE, the UE can simply subtract the value of TA from the transmission time of the RTT Measurement signal 562 to obtain the value of Tx0 used in equation 570. When E2 554 is the UE and variant V1 or variant V3 is used, the transmission time Tx1 determined by E1 552 will be in error and will exceed a correct value for Tx1 by an amount TA. To compensate, the UE can add the value of TA to the value of Rx0 sent to E1 552 in the payload of the RTT Response 564. Alternatively, for any of the variants, the UE can send the value of TA to the serving gNB (if the serving gNB does not have the value of TA) and the network side can adjust Tx1 by subtracting the value of TA. All of these additions and subtractions may be performed modulo 1 ms.

Figure 6:
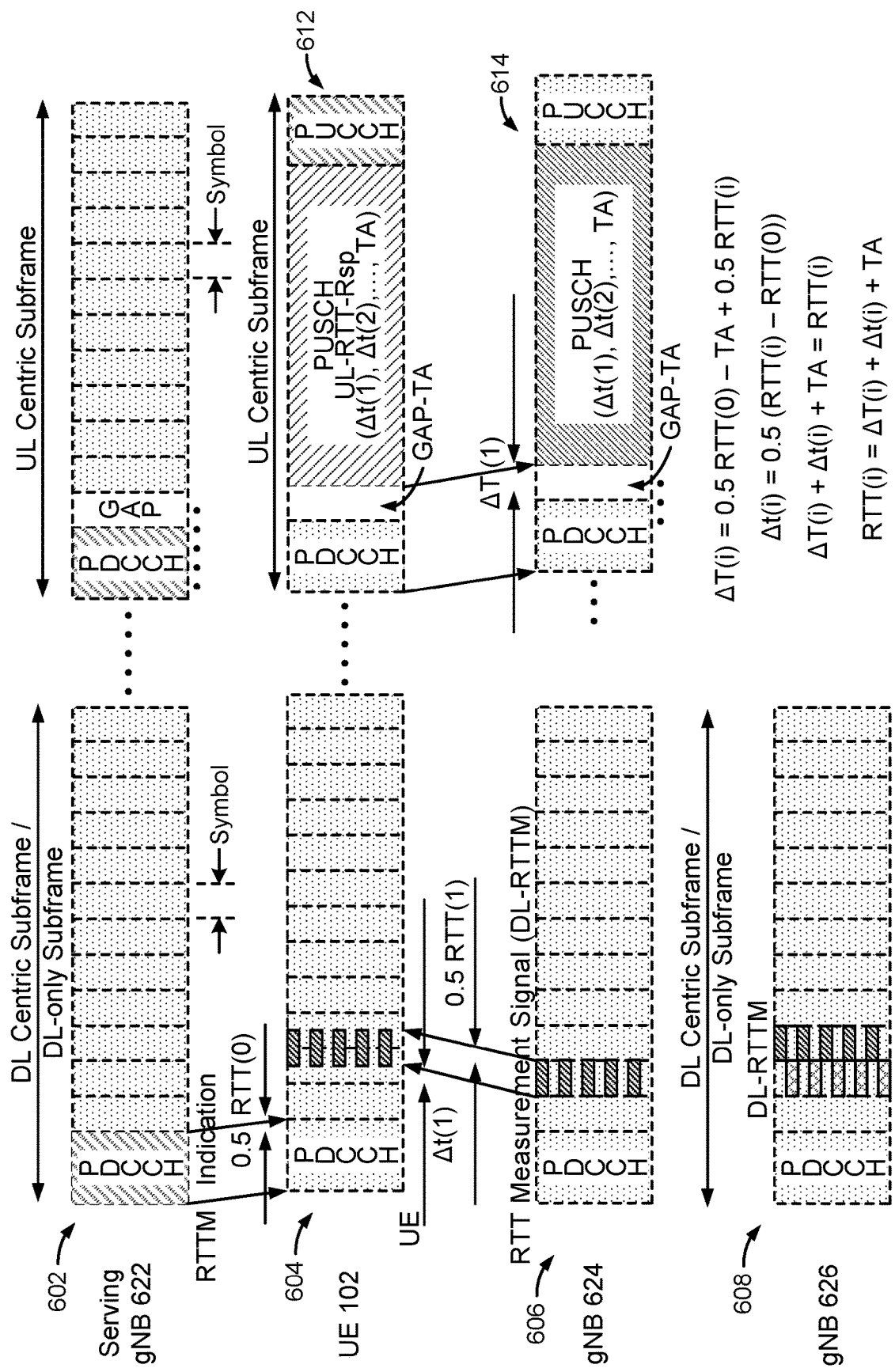
FIG. 6 illustrates an example of network-centric RTT estimation according to an aspect of the disclosure.
Figure 7:
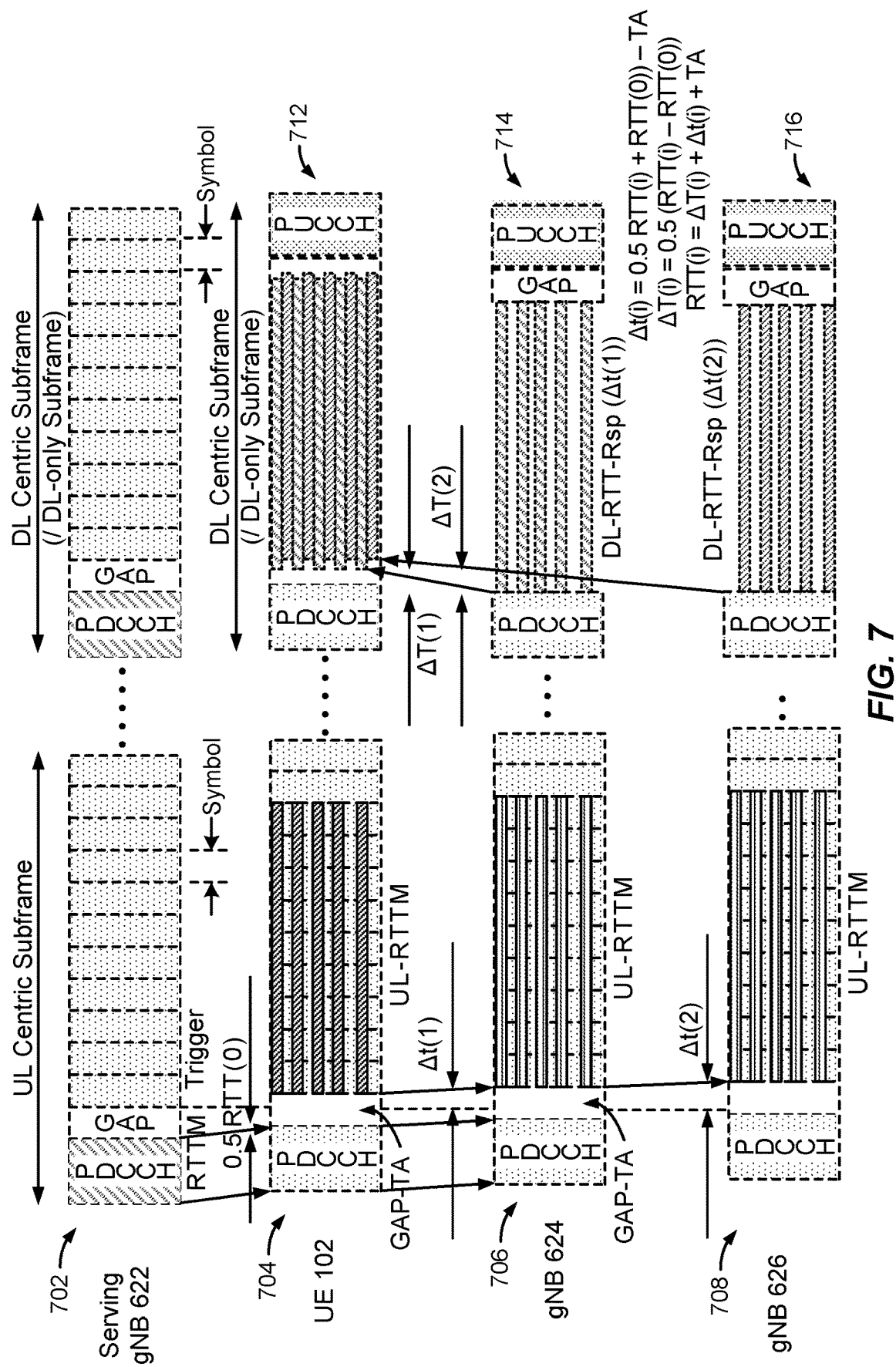
FIG. 7 illustrates an example of UE-centric RTT estimation according to an aspect of the disclosure.

FIGS. 6 and 7 provide additional examples of determining an RTT when the timing at gNBs and a UE may be aligned. These examples show some additional details of the signaling and the procedure. The examples in FIGS. 6 and 7 can apply to the variant V1 described above for FIG. 5B. though may also apply to other variants. An individual RTT Response message directed at a particular gNB(i) includes, in its payload, timestamp(s) ($\Delta t(i)+TA$), where $\Delta t(i)$ denotes the arrival time of an RTT Measurement signal received from a gNB(i), and TA denotes the uplink timing-adjust parameter of the UE. A common RTT Response message includes, in its payload, a set of timestamps ($\Delta t(i)+TA$) for the RTT Measurement signals from all measured gNBs. The timestamps ($\Delta t(i)+TA$) may be organized in other ways, well-known to a person of ordinary skill in the art.

The network may allocate low reuse resources for the UE to transmit the RTT Response message(s). In any case, each gNB(i) that receives an RTT Response message records its arrival time $\Delta T(i)$ at the gNB(i) relative to the downlink time-reference of the gNB(i). The gNB(i) can compute the RTT between the UE and itself by adding the timestamp value ($\Delta t(i)+TA$) to the arrival time $\Delta T(i)$. This computation may be performed either at the gNBs receiving the RTT Response from the UE, or at a central location in the network (e.g., location server 170 or the serving gNB).

FIG. 6 illustrates an example of the network-centric RTT estimation technique according to an aspect of the disclosure. As shown in FIG. 6, on a downlink-centric/downlink-only subframe (at low duty-cycle) 602, the serving gNB 622 sends a control signal (e.g., on the Physical Downlink Control Channel (PDCCH)) to the UE 102 during the first two symbol periods of the downlink subframe 602, indicating to the UE 102 that one or more gNBs (the serving gNB 622, a gNB 624 and a gNB 626 in the example of FIG. 6) will be transmitting downlink RTT Measurement (RTTM) signal(s).

During the downlink subframes 606 and 608, gNB 624 and gNB 626 transmit downlink RTT Measurement signals at specified (by the network, e.g., location server 170, or the serving gNB 622) symbols of the downlink subframes 606 and 608, in a time division multiplexing (TDM) or frequency division multiplexing (FDM) fashion (as illustrated by the horizontal subdivisions of the respective symbols of the downlink subframes 606 and 608). Although not illustrated, the serving gNB 622 may also transmit downlink RTT Measurement signal(s) (also referred to as RTT Measurement signal(s)) during the downlink subframe 602. The downlink RTT Measurement signals transmitted by the gNBs 622-626 may be wideband signals to enable the UE 102 to make precise timing measurements. No other signals may be transmitted in or around the symbols associated with the downlink RTT Measurement signals by any other gNB in the neighborhood (resulting in low-reuse of the RTT Measurement signals, interference avoidance, and deep penetration of the RTT Measurements signals).

During the downlink subframe 604, the UE 102 measures the arrival time $\Delta t(i)$ of each downlink RTT Measurement signal transmitted by the gNBs 624 and 626 during the downlink subframes 606 and 608 relative to its own downlink subframe timing. The UE 102 derives its downlink subframe timing from the downlink signal received from the serving gNB 622 on the PDCCH. That is, the UE 102 sets the start time of its PDCCH subframe to the time at which it received the downlink signal from the serving gNB 622.

The UE 102 is instructed to report its RTT Measurements (i.e., the arrival time measurements $\Delta t(i)$) of the RTT Measurement signals transmitted by the gNBs 622-626 on the Physical Uplink Shared Channel (PUSCH) during a subsequent uplink subframe, which it does during uplink subframe 612. This uplink RTT report (also referred to as an RTT Response) from the UE 102 may include the arrival times $\Delta t(i)$ of each measured downlink RTT Measurement signal (where the RTT report is a "common" report), as well as the UE 102's own uplink timing-adjust (TA) provided by the serving gNB 622. Like the downlink RTT Measurement signals transmitted by the gNBs 622-626, the uplink RTT report transmitted by the UE 102 should be a wideband signal to enable the gNBs to make precise timing measurements of its arrival. Each gNB in the UE 102's neighborhood (i.e., within communication range of the UE 102; gNBs 622-626 in the example of FIG. 6) receives the uplink RTT report from the UE 102. In the example of FIG. 6, the gNB 624 receives the uplink RTT report from the UE 102 during the uplink subframe 614. Each gNB(i) decodes the uplink RTT report from the UE 102, and records the respective arrival time $\Delta T(i)$ of the uplink RTT report from the UE 102, relative to its own system time. Each gNB(i) may then compute the RTT between the gNB(i) and the UE 102 based on the arrival time of the uplink RTT report from the UE 102, combined with the timing information in the payload (i.e., the arrival times of the RTT Measurements and the timing-adjust.

Note that the timing-adjust is a parameter that accounts for the UE 102's distance from the serving gNB 622. More specifically, the timing-adjust is the time from the beginning of a timeslot (e.g., an OFDM symbol 211) at which the UE 102 is permitted to transmit a burst of traffic to prevent collisions with adjacent UEs. The timing-adjust enables all uplink signals from the UE 102 to arrive at the serving gNB 622 at the same time. The uplink timing adjust enables the uplink RTT report to arrive at the end of the gap, with the needed precision, following the PDCCH.

A UE-centric RTT estimation is similar to the network-based method described above, except that the UE (e.g., UE 102) transmits uplink RTT Measurement signal(s) (when instructed), which are received by multiple gNBs in the neighborhood of the UE. Each gNB(i) responds with a downlink RTT Response message, including the arrival time $\Delta t(i)$ of the RTT Measurement signal at the gNB(i) from the UE in the message payload. The UE determines the arrival time $\Delta T(i)$ of the downlink RTT Response message from each gNB(i), decodes the RTT Response message and timing estimates, extracts the time-stamp $\Delta t(i)$ embedded in the message, and computes the RTT for the responding gNB(i) by adding the measured arrival-time $\Delta T(i)$, the extracted time-stamp $\Delta t(i)$, and its own uplink-downlink timing-adjust (TA) value.

FIG. 7 illustrates an example of the UE-centric RTT estimation technique according to an aspect of the disclosure. On an uplink-centric (at low duty-cycle) subframe 702, the serving gNB 622 sends a control signal (e.g., on the PDCCH) to the UE 102, instructing the UE 102 (and possibly any number of other UEs) to transmit one or more uplink RTT Measurement signals (UL-RTTMs).

During the uplink subframe 704, the UE 102 transmits one or more RTT Measurement signals (as specified by the serving gNB 622) using specified resource blocks (RBs) for the uplink data portion of the uplink subframe 704, in a TDM or FDM fashion (as illustrated by the horizontal subdivisions of the respective symbols of the uplink subframe 704). The RTT Measurement signal(s) may be wideband signals to enable more precise timing measurements. No other signals may be transmitted on the symbols associated with the uplink RTT Measurement signal(s) by any UE in the neighborhood (resulting in low reuse, interference avoidance, and deep penetration of RTTM).

During the uplink subframes 706 and 708, each gNB in the neighborhood (i.e., within communication range of the UE 102; gNBs 622-626 in the example of FIG. 7) measures the arrival time Δt(i) at the respective gNB(i) of each received uplink RTT Measurement signal relative to its own downlink subframe timing (assuming a synchronous deployment of the gNBs). The serving gNB 622 instructs the UE 102 to scan for/receive downlink RTT Responses from the gNBs 622-626 on a subsequent downlink subframe, which occurs in the example of FIG. 7 during the downlink subframes 714 and 716. The downlink RTT Response from each gNB 622-626 includes the arrival time Δt(i) at the respective gNB(i) of the uplink RTT Measurement signal(s) from the UE 102. In an aspect, the RTT Responses should be wideband signals to enable the UE 102 to make precise timing measurements.

The UE 102, and possibly each UE in the neighborhood (e.g., some or all UEs within communication range of the gNBs 622-626), decodes the RTT Responses from the gNBs 622-626 during the downlink subframe 712, and also measures the arrival time ΔT(i) of the downlink RTT Response from the respective gNB(i) of the gNBs 622-626, relative to its own (downlink) system time.

The RTT for the UE 102 may be computed from the arrival time of the downlink RTT Response at the UE 102, combined with timing information in the downlink RTT Response (i.e., the arrival time Δt(i)), along with its own timing-adjust (provided by the serving gNB). Any mismatch between inter-gNB timing may be absorbed into 0.5 RTT(0); there is no requirement for precise timing synchronization across the gNBs 622-626 in 5G NR.

The RTT estimation procedures disclosed herein can be extended to massive Multiple Input-Multiple Output (MIMO) and to the extremely-high frequency (EHF) region of the spectrum, also known as millimeter wave (mmW) (generally, spectrum bands above 24 GHz) systems. In mmW band systems, as well as massive MIMO systems in any band, gNBs use transmission/reception beamforming to extend signal coverage to the cell edge.

Transmit "beamforming" is a technique for focusing an RF signal in a specific direction. Traditionally, when a base station broadcasts an RF signal, it broadcasts the signal in all directions (omni-directionally) or over a wide range of angles (e.g., for a cell-sector). With transmit beamforming, the base station determines where a given target device (e.g., UE 102) is located (relative to the base station) and projects a stronger downlink RF signal in that specific direction, thereby providing a faster (in terms of data rate) and stronger RF signal for the receiving device(s). To change the directionality of the RF signal when transmitting, a base station can control the phase and relative amplitude of the RF signal at each transmitter. For example, a base station may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., Reference Signal Received Power (RSRP), Signal-to-Noise plus Interference Ratio (SINR), etc.) of the RF signals received from that direction.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Figure 8:
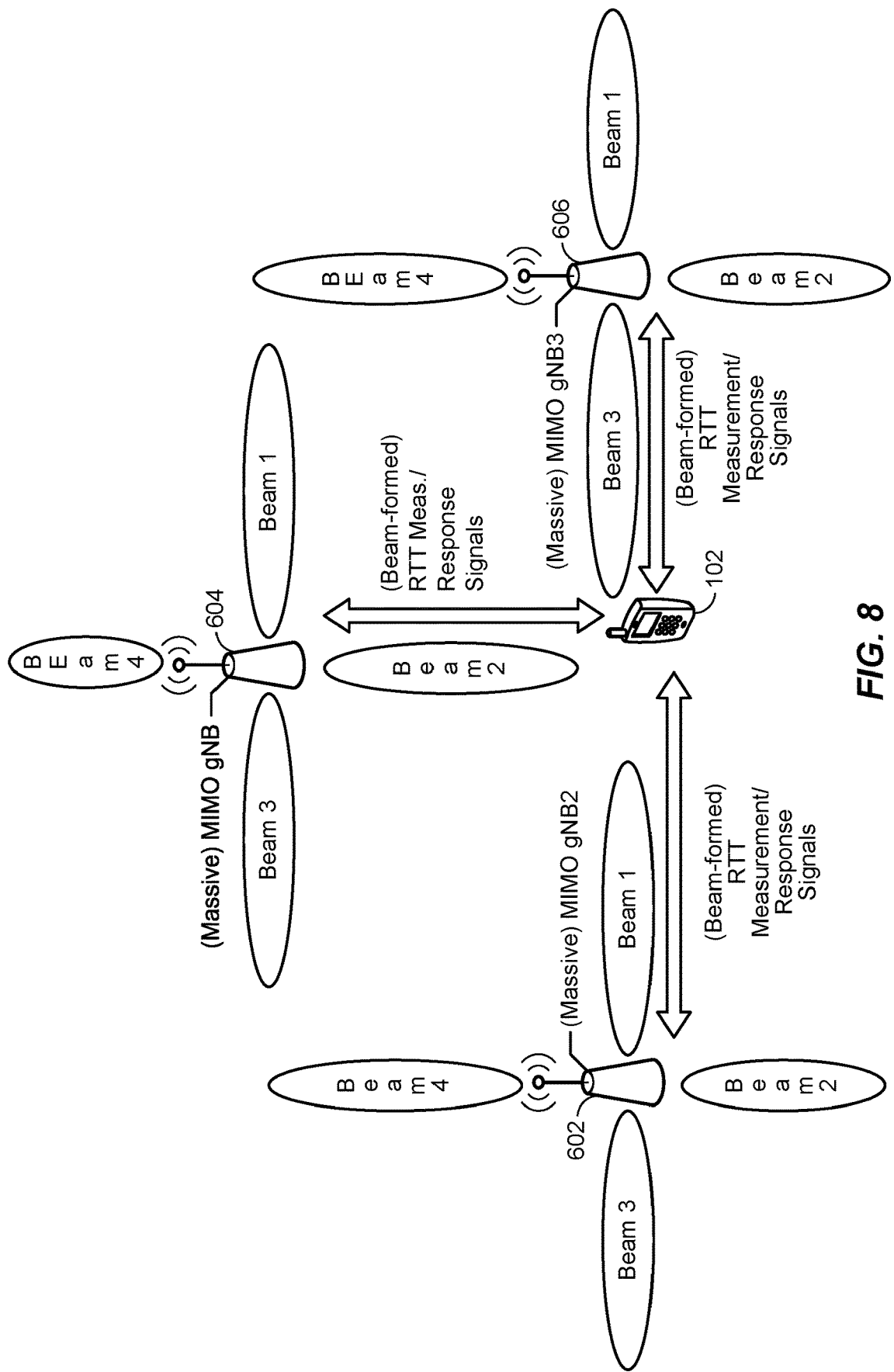
FIG. 8 illustrates an exemplary system in which RTT estimation procedures disclosed herein are extended to massive Multiple Input-Multiple Output (MIMO) and millimeter wave (mmW) systems according to an aspect of the disclosure.

FIG. 8 illustrates an exemplary system in which the RTT estimation procedures disclosed herein are extended to massive MIMO and mmW systems according to an aspect of the disclosure. In the example of FIG. 8, gNBs 622-626 are massive MIMO gNBs. To perform the RTT estimation procedure described herein in massively beam-formed systems (e.g., MIMO, mmW), each physical gNB (e.g., gNBs 622-626) acts like a set of multiple "logical gNBs," transmitting its RTT Measurement or RTT Response signals on multiple beams (e.g., beams 1-4) on different time-frequency resources, in a TDM or FDM fashion. The RTT Measurement/Response signals may (implicitly or explicitly) carry information about the identity of the gNB transmitting the signal, as well as the beam-index (e.g., 1-4) used to transmit them. The UE (e.g., UE 102) processes the RTT (Measurement/Response) signals received on the downlink as if they were transmitted by different gNBs. In particular, the UE records or reports the beam index (or indices) or other beam identity (or identities) on which the RTT signals were received, in addition to the timestamps (e.g., arrival times) described earlier. The recorded beam indices (or identities) may be used to identify the downlink (DL) beams measured by the UE 102 and to determine an associated Angle of Departure (AOD) for each identified DL beam from the transmitting gNB towards the UE 102. The AOD may be used to determine an estimated direction of the UE 102 from a gNB.

During reception, the gNBs 622-626 record/report the receive beam index (or other receive beam identity) on which the RTT (Measurement/Response) signals were received from the UE 102, and (for UE-centric RTT estimation) include that information in the RTT Response payload, along with the timestamps (e.g., arrival time) described earlier. Similar to the DL beams measured and identified by the UE 102, the receive beam indices recorded (and reported) by the gNBs 622-626 may be used to determine an associated Angle of Arrival (AOA) for each identified receive beam from the receiving gNB towards the UE 102. The AOA may be used to determine an estimated direction of the UE 102 from a gNB.

When AOAs and/or AODs are available for a UE as described above, location determination for the UE based on RTTs as described for FIG. 4 can be improved (e.g., made more accurate) by calculating a location for the UE using the RTT(s), AOD(s) and/or AOA(s).

In case any of the gNBs 622-626 have fewer RF chains than the number of receive beams the gNB uses (as a single hardware receiver chain may be configurable to generate multiple receive beams), the UE 102 may be commanded to repeat the RTT Measurement/Response messages multiple times, so that the gNB may sequentially cycle through the set of all receive beams that may be used to receive the RTT signals from the UE 102, based on its limited base-band processing capabilities. An RF chain may be a receiver chain or a transmitter chain, and is the hardware utilized to receive or transmit RF signals of a given frequency or set of frequencies. More specifically, a receiver chain includes the hardware components of a single hardware receiver of a plurality of hardware receivers of the device, and may include a receive antenna, radio, and modem. Likewise, a transmitter chain includes the hardware components of a single hardware transmitter of a plurality of hardware transmitters of the device, and may include a transmit antenna, radio, and modem. A device (e.g., a gNB 622-626 or UE 102) may have multiple receiver/transmitter chains, and may thereby be able to transmit and/or receive RF signals on multiple frequencies at the same time.

In an aspect, in (massive) MIMO systems, either or both of the gNBs 622-626 and the UE 102 may repeat their RTT Measurement/Report signals multiple times. The different repetitions may use either the same or different transmission-beams. When a signal is repeated with the same transmission beam, it is intended to support reception-beam-sweeping (in addition to coherent-combining if needed) at the receiving end-point (the UE 102 or a gNB 622-626).

In an aspect, the angle-of-arrival (AOA)/angle-of-departure (AOD) (at the gNB 622-626) associated with the beam-index information may be used in conjunction with RTT estimates to compute the geographic position of the UE (RTT plus AOA/AOD based positioning).

Figure 9:
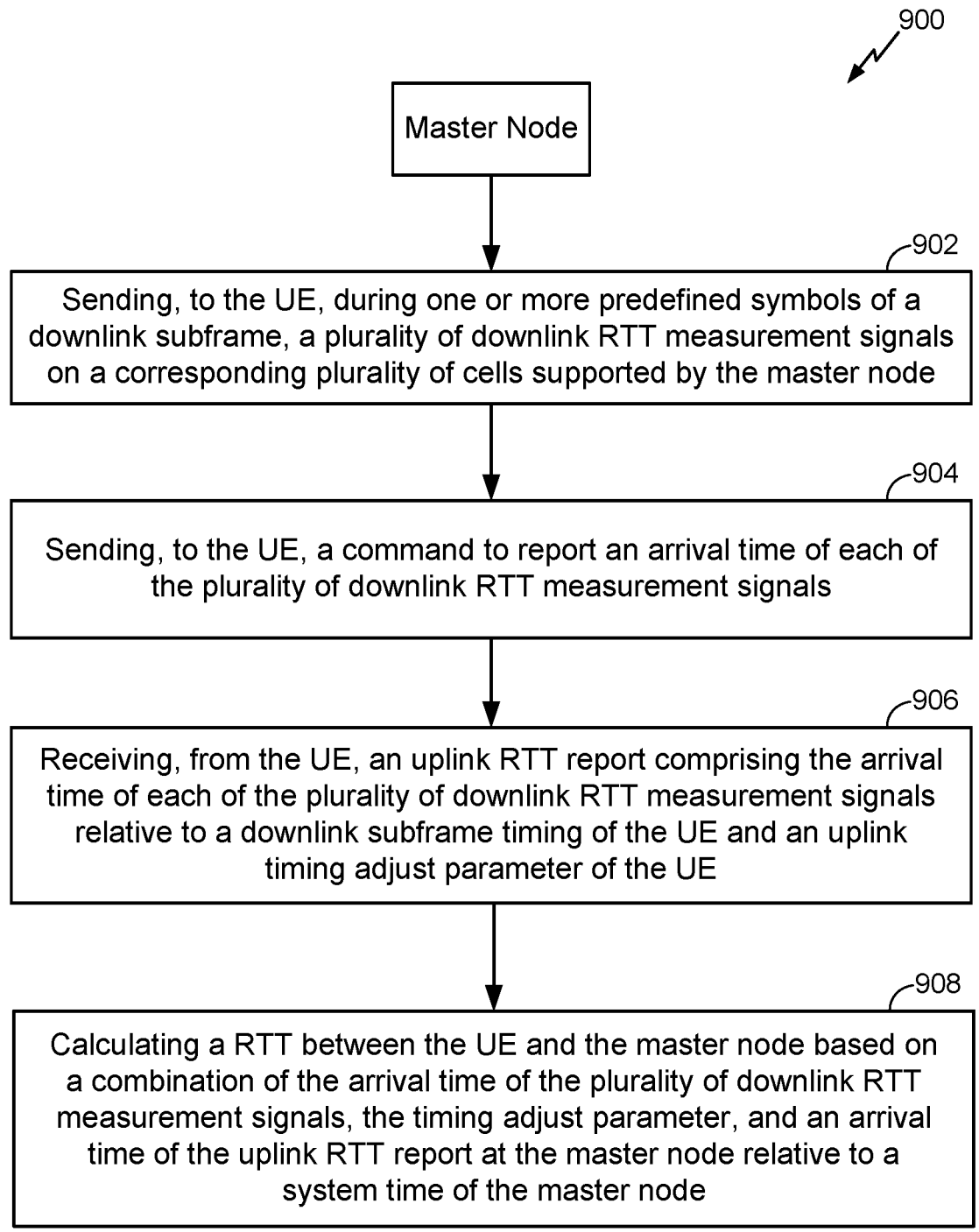
FIGS. 9-12 illustrate exemplary methods for calculating RTT(s) of a UE, according to aspects of the disclosure.

FIG. 9 illustrates an exemplary method 900 for calculating an RTT of a UE (e.g., UE 102) performed by a master node, such as a serving base station or non-serving base station (e.g., any of gNBs 502, 622-626). The method 900 may be performed by, for example, the communication device 314 and/or the processing system 334 of the apparatus 304 in FIG. 3 based on execution of the RTT measurement component 354. At 902, the master node (e.g., the communication device 314) sends, to the UE 102, during one or more predefined symbols of a downlink subframe, a plurality of downlink RTT measurement signals on a corresponding plurality of cells supported by the master node. At 904, the master node (e.g., the communication device 314) sends, to the UE 102, a command to report an arrival time of each of the plurality of downlink RTT measurement signals. At 906, the master node (e.g., the communication device 314, or the processing system 334 from the communication device 314) receives, from the UE 102, an uplink RTT report comprising the arrival time of each of the plurality of downlink RTT measurement signals relative to a downlink subframe timing of the UE and an uplink timing adjust parameter of the UE. At 908, the master node (e.g., the processing system 334) calculates an RTT between the UE and the master node based on a combination of the arrival time of the plurality of downlink RTT measurement signals, the timing adjust parameter, and an arrival time of the uplink RTT report at the master node relative to a system time of the master node.

Figure 10:
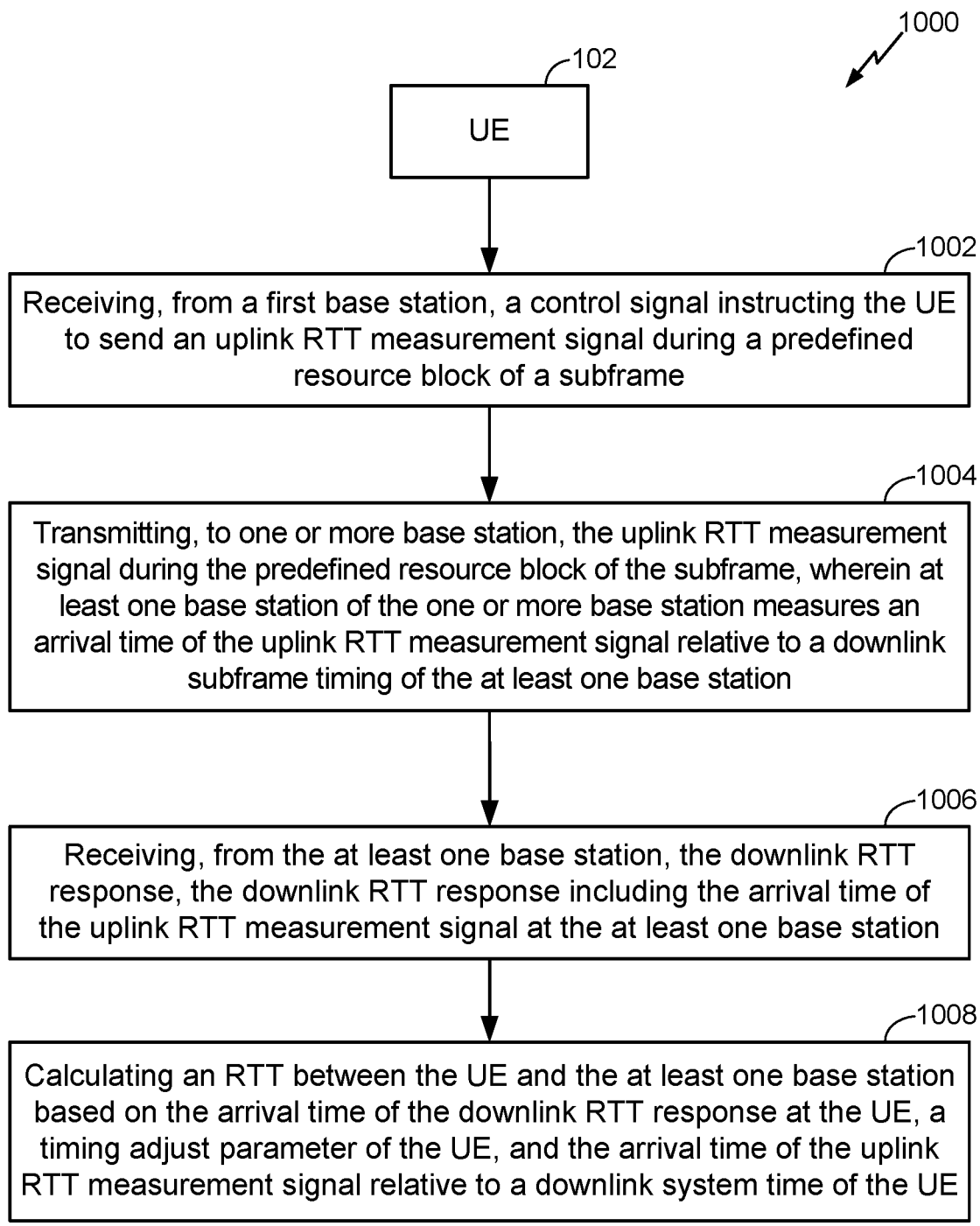

FIG. 10 illustrates an exemplary method 1000 for calculating an RTT at a UE (e.g., UE 102). The method 1000 may be performed by, for example, the communication device 308 and/or the processing system 332 in FIG. 3 based on execution of the RTT measurement component 352.

At 1002, the UE 102 (e.g., the communication device 308, or the processing system 332 from the communication device 308) receives, from a first base station (e.g., any of gNBs 502 and 622-626), a control signal instructing the UE to send an uplink RTT measurement signal during a predefined resource block of a subframe. In an aspect, the UE 102 receives the control signal on the PDCCH. In an aspect, the uplink RTT measurement signal comprises a wideband signal. In an aspect, the first base station is a serving base station for the UE 102.

At 1004, the UE 102 (e.g., the communication device 308, or the processing system 332 to the communication device 308) transmits, to one or more base stations (e.g., any of gNBs 502, 622-626), the uplink RTT measurement signal during the predefined resource block of the subframe, wherein at least one base station of the one or more base stations measures an arrival time of the uplink RTT measurement signal relative to a downlink subframe timing of the at least one base station. In an aspect, the one or more base stations are neighbor base stations of the first base station within communication range of the UE.

At 1006, the UE 102 (e.g., the communication device 308, or the processing system 332 from the communication device 308) receives, from the at least one base station, a downlink RTT response, the downlink RTT response including the arrival time of the uplink RTT measurement signal. In an aspect, the UE 102 receives a downlink RTT response including an arrival time of the uplink RTT measurement signal from each of the one or more base stations.

At 1008, the UE 102 (e.g., the communication device 308) calculates an RTT between the UE 102 and the at least one base station based on an arrival time of the downlink RTT response at the UE 102, a timing adjust parameter of the UE 102, and the arrival time of the uplink RTT measurement signal relative to a downlink system time of the UE 102. The UE 102 receives the uplink timing adjust parameter from the first base station. In an aspect, the RTT is the sum of the arrival time of the downlink RTT response, the timing adjust parameter, and the arrival time of the uplink RTT measurement signal relative to the downlink system time of the UE 102.

Figure 11:
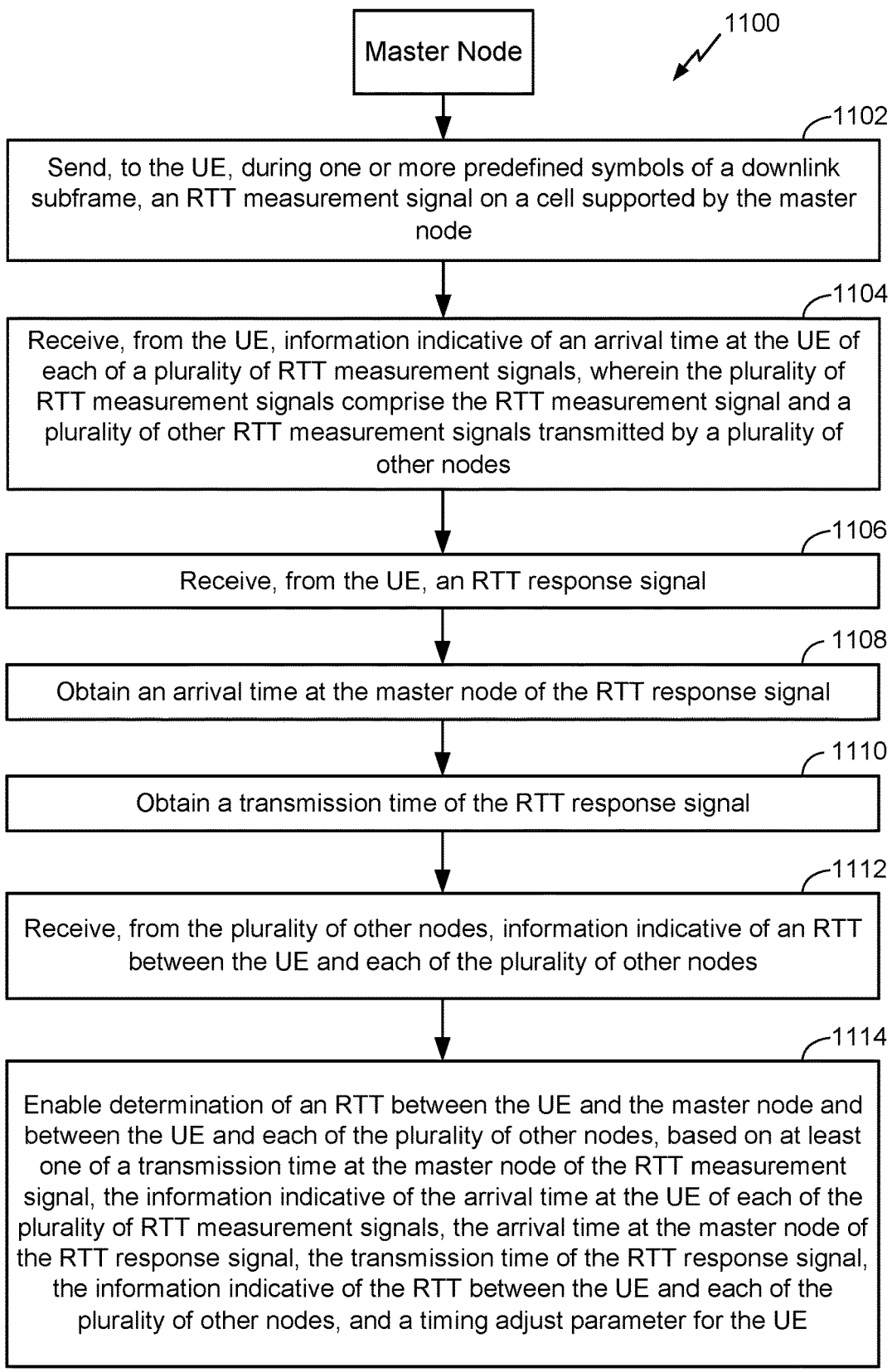

FIG. 11 illustrates an exemplary method 1100 for determining multiple RTTs for a UE according to aspects of the disclosure, such as a serving base station or a non-serving base station (e.g., any of gNBs 502, 622-626). The method 1100 may be performed by, for example, the communication device 314 and/or the processing system 334 of the apparatus 304 in FIG. 3 based on execution of the RTT measurement component 354.

At 1102, the master node (e.g., the communication device 314) sends, to the UE, during one or more predefined symbols of a downlink subframe, an RTT measurement signal on a cell supported by the master node.

At 1104, the master node (e.g., the communication device 314) receives, from the UE, information indicative of an arrival time at the UE of each of a plurality of RTT measurement signals, wherein the plurality of RTT measurements signals comprise the RTT measurement signal and a plurality of other RTT measurement signals transmitted by a plurality of other nodes. In an aspect, the plurality of other nodes may be neighboring base stations within communication range of the UE. In an aspect, the plurality of RTT measurement signals may be wideband signals. In an aspect, the plurality of RTT measurement signals may be transmitted on low reuse resources. In an aspect, at least one of the master node and the plurality of other nodes transmits at least one of the plurality of RTT measurement signals on one or more transmit beams, wherein the UE reports an identity for at least one transmit beam of the one or more transmit beams, wherein the identity for the at least one transmit beam enables a determination of an AOD for the UE.

At 1106, the master node (e.g., the communication device 314) receives, from the UE, an RTT response signal. In an aspect the RTT response signal may be transmitted on low reuse resources. In an aspect, at least one of the master node and the plurality of other nodes receives the RTT response on one or more receive beams, wherein an identity for the at least one receive beam enables a determination of an AOA for the UE. In an aspect, at least one of the master node and the plurality of other nodes utilizes multiple receive beams, wherein, based on the at least one of the master node and the plurality of other nodes having fewer hardware receiver chains than a number of the multiple receive beams, the UE transmits the RTT response multiple times to permit the at least one of the master node and the plurality of other nodes to sequentially cycle through all of the multiple receive beams that may be used to receive the RTT response from the UE. In an aspect, the master node sends a command to the UE to transmit the RTT response multiple times.

At 1108, the master node (e.g., the processing system 334) obtains an arrival time at the master node of the RTT response signal.

At 1110, the master node (e.g., the processing system 334) obtains a transmission time of the RTT response signal. In an aspect, obtaining the transmission time of the RTT response signal may include at least one of: (1) determining the transmission time of the RTT response signal based on a content of the RTT response signal, (2) receiving the transmission time of the RTT response signal in a separate message from the UE, or (3) determining by the master node the transmission time of the RTT response signal and sending the transmission time of the RTT response signal to the UE prior to the transmission time of the RTT response signal.

At 1112, the master node (e.g., the communication device 314) receives, from the plurality of other nodes, information indicative of an RTT between the UE and each of the plurality of other nodes. In an aspect, the information indicative of the RTT between the UE and each of the plurality of other nodes may include information indicative of a transmission time of each of the RTT measurement signals transmitted by the plurality of other nodes and information indicative of an arrival time of the RTT response signal at each of the plurality of other nodes.

At 1114, the master node (e.g., the communication device 314 or the processing system 334) enables determination of an RTT between the UE and the master node and between the UE and each of the plurality of other nodes, based on at least one of a transmission time at the master node of the downlink RTT measurement signal, the information indicative of the arrival time at the UE of each of the plurality of RTT measurement signals, the arrival time at the master node of the RTT response signal, the transmission time of the RTT response signal, the information indicative of the RTT between the UE and each of the plurality of other nodes, and a timing adjust parameter for the UE.

In an aspect, the enabling at 1114 includes performing the determination at the master node. In an aspect, the enabling at 1114 includes sending, to a location server, at least one of the transmission time at the master node of the downlink RTT measurement signal, the information indicative of the arrival time at the UE of each of the plurality of RTT measurement signals, the arrival time at the master node of the RTT response signal, the transmission time of the RTT response signal, the information indicative of the RTT between the UE and each of the plurality of other nodes, and the timing adjust parameter for the UE.

In an aspect, although not illustrated, the method 1100 may further include sending, to the UE, a control signal indicating that the master node and the plurality of other nodes will be transmitting the plurality of RTT measurement signals during a plurality of predefined symbols of downlink subframes. The master node may send the control signal on a PDCCH. The control signal may further request the UE to report the information indicative of the arrival time at the UE of each of the plurality of RTT measurement signals. The UE may include the information indicative of the arrival time at the UE of each of the plurality of RTT measurement signals in a payload for the RTT response signal. In that case, the receiving at 1104 may include decoding the payload for the RTT response signal. Each node of the plurality of other nodes may calculate a respective RTT between the UE and the each node based on: (1) a transmission time at the each node of a downlink RTT measurement signal in the plurality of other RTT measurement signals transmitted by the each node, (2) the information indicative of the arrival time at the UE of the each of the plurality of RTT measurement signals included in the payload for the RTT response signal, (3) the arrival time at the each node of the RTT response signal, and (4) a transmission time of the RTT response signal, wherein the each node determines the transmission time of the RTT response signal and the information indicative of the arrival time at the UE of the each of the plurality of RTT measurement signals included in the payload for the RTT response signal by demodulating and decoding the RTT response signal, wherein the information received by the master node from the each node indicative of the RTT between the UE and the each node comprises the calculated respective RTT.

In an aspect, although not illustrated, the method 1100, may further include sending the timing adjust parameter to the UE or receiving the timing adjust parameter from the UE. The UE may send the RTT response on a PUSCH.

Figure 12:
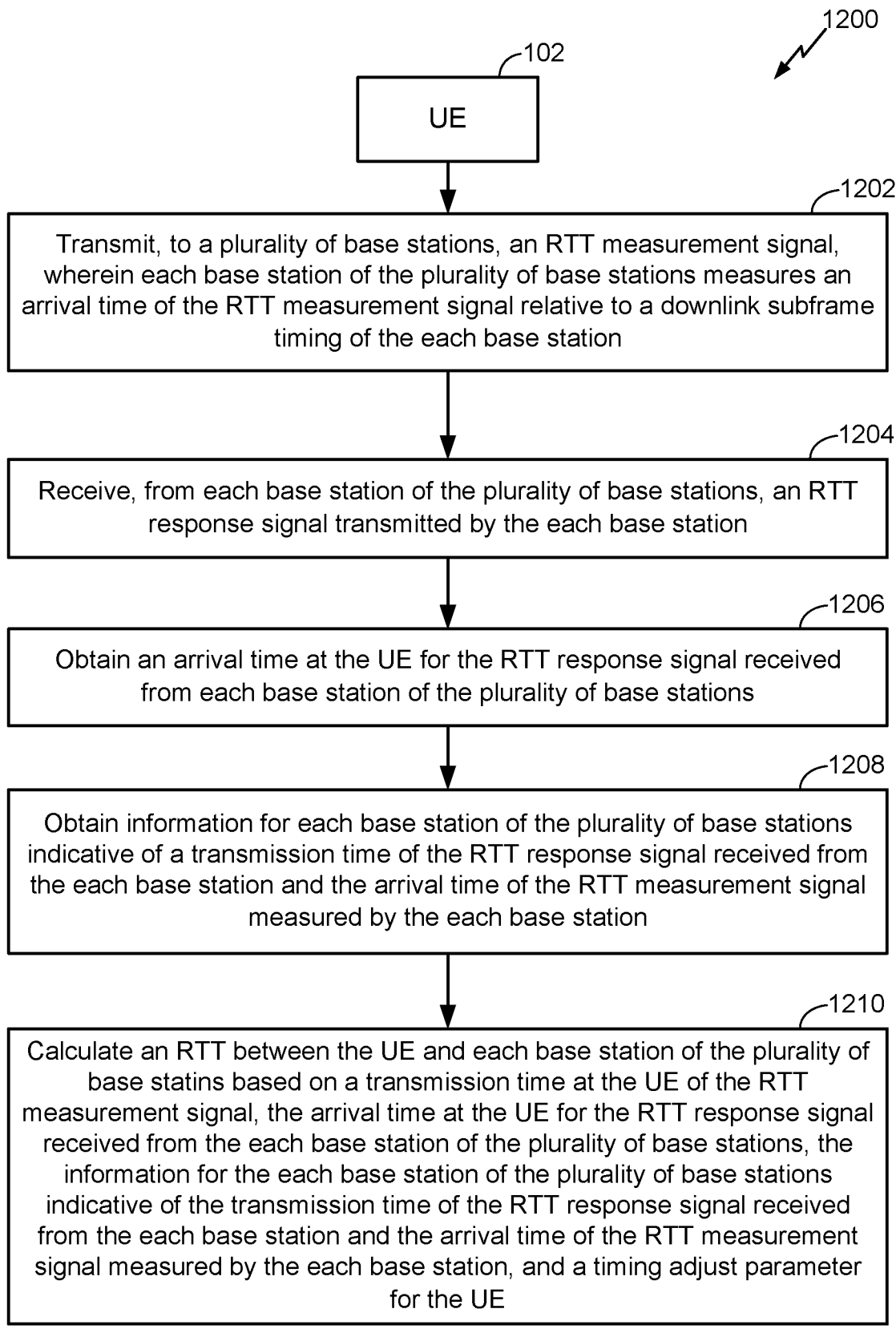

FIG. 12 illustrates an exemplary method 1200 for determining multiple RTTs at a UE (e.g., UE 102). The method 1000 may be performed by, for example, the communication device 308 and/or the processing system 332 in FIG. 3 based on execution of the RTT measurement component 352.

At 1202, the UE (e.g., the communication device 308) transmits, to a plurality of base stations (e.g., any of gNBs 502, 622-626), an RTT measurement signal, wherein each base station of the plurality of base stations measures an arrival time of the RTT measurement signal relative to a downlink subframe timing of the each base station. In an aspect, the plurality of base stations may be neighboring base stations within communication range of the UE. In an aspect, the UE may transmit the RTT Measurement signal on a PUSCH. In an aspect, the RTT measurement signal may be a wideband signal.

In an aspect, at least one base station of the plurality of base stations receives the RTT measurement signal on each of one or more receive beams of the at least one base station.

In an aspect, the at least one base station may utilize multiple receive beams, and wherein, based on the at least one base station having fewer hardware receiver chains than a number of the multiple receive beams, the UE receives a command to transmit the RTT measurement signal multiple times to permit the at least one base station to sequentially cycle through all of the multiple receive beams that may be used by the at least one base station to receive the RTT measurement signal from the UE.

At 1204, the UE receives, from each base station of the plurality of base stations, an RTT response signal transmitted by the each base station. In an aspect, at least one base station of the plurality of base stations may transmit the RTT response signal on each of one or more transmit beams of the at least one base station. In an aspect, the RTT measurement signal and the RTT response signals may be transmitted on low reuse resources.

At 1206, the UE obtains an arrival time at the UE for the RTT response signal received from each base station of the plurality of base stations.

At 1208, the UE obtains information for each base station of the plurality of base stations indicative of a transmission time of the RTT response signal received from the each base station and the arrival time of the RTT measurement signal measured by the each base station. In an aspect, each base station of the plurality of base stations includes the arrival time of the RTT measurement signal measured by the each base station in a payload of the RTT response signal transmitted by the each base station. In that case, the obtaining at 1208 may include demodulating and decoding the RTT response signal received from the each base station. In an aspect, the obtaining at 1208 may include receiving the information for the each base station of the plurality of base stations from a serving base station for the UE.

At 1208, the UE calculates an RTT between the UE and each base station of the plurality of base statins based on a transmission time at the UE of the RTT measurement signal, the arrival time at the UE for the RTT response signal received from the each base station of the plurality of base stations, the information for the each base station of the plurality of base stations indicative of the transmission time of the RTT response signal received from the each base station and the arrival time of the RTT measurement signal measured by the each base station, and a timing adjust parameter for the UE. The UE may receive the timing adjust parameter from a serving base station for the UE.

In an aspect, although not illustrated in FIG. 12, the method 1200 may further include receiving, from a serving base station for the UE, a control signal instructing the UE to transmit the RTT measurement signal during a predefined resource block of a subframe. In an aspect, the UE may receive the control signal on a PDCCH.

In an aspect, although not illustrated in FIG. 12, the method 1200 may further include receiving, from a serving base station for the UE, an instruction to scan for the RTT response signal received from the each base station of the plurality of base stations.

Figure 13:
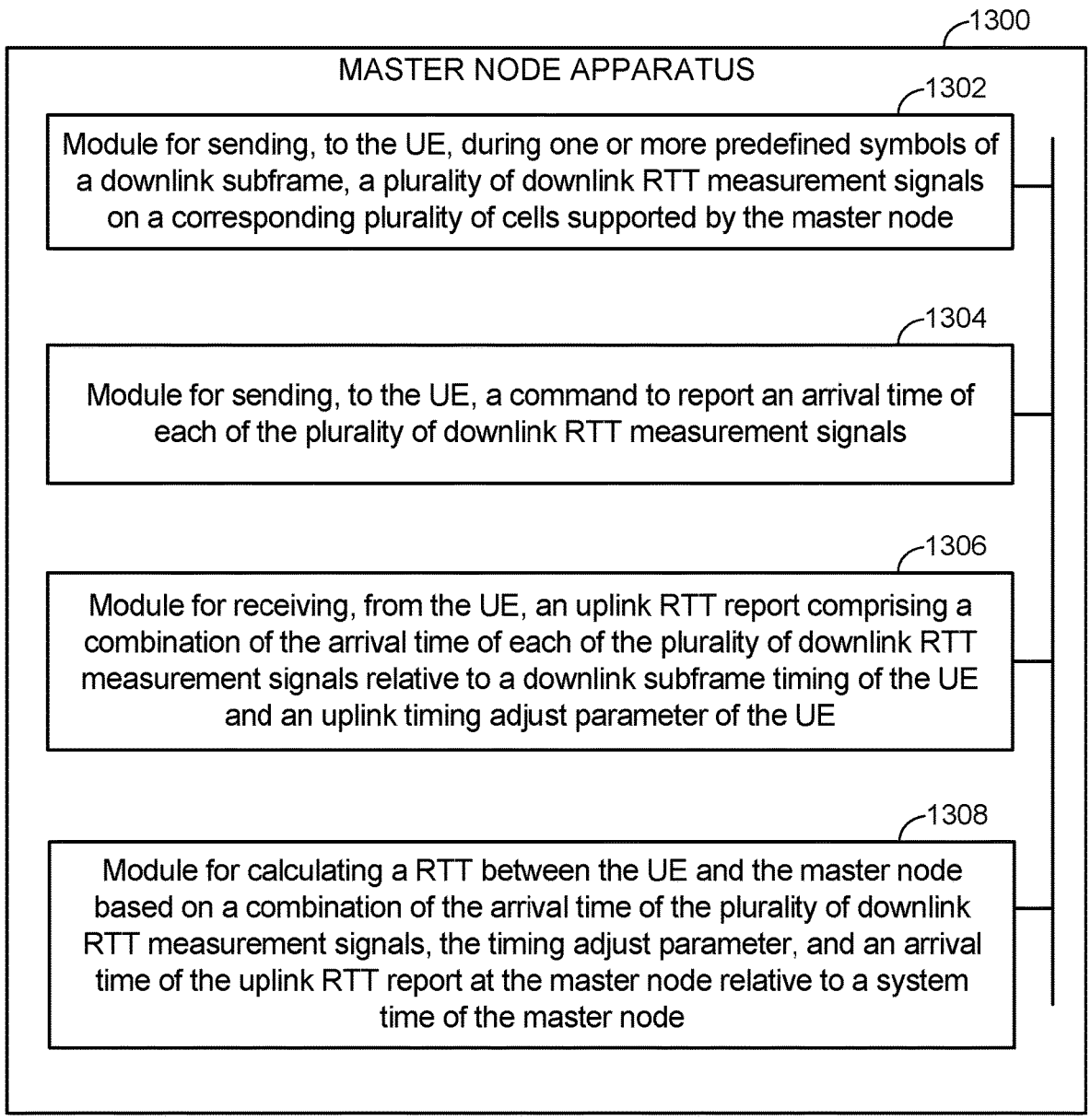
FIGS. 13-16 are other simplified block diagrams of several sample aspects of apparatuses configured to support positioning and communication as taught herein.

FIG. 13 illustrates an example master node apparatus 1300 (e.g., any of eNBs 202-206 or gNBs 502 and 622-626) represented as a series of interrelated functional modules connected by a common bus. A module for sending 1302 may correspond at least in some aspects to, for example, a communication device, such as communication device 314 in FIG. 3, and/or a processing system, such as processing system 334 in FIG. 3, as discussed herein. A module for sending 1304 may correspond at least in some aspects to, for example, a communication device, such as communication device 314 in FIG. 3, and/or a processing system, such as processing system 334 in FIG. 3, as discussed herein. A module for receiving 1306 may correspond at least in some aspects to, for example, a communication device, such as communication device 314 in FIG. 3, and/or a processing system, such as processing system 334 in FIG. 3, as discussed herein. A module for calculating 1308 may correspond at least in some aspects to, for example, a processing system, such as processing system 334 in FIG. 3, as discussed herein.

Figure 14:
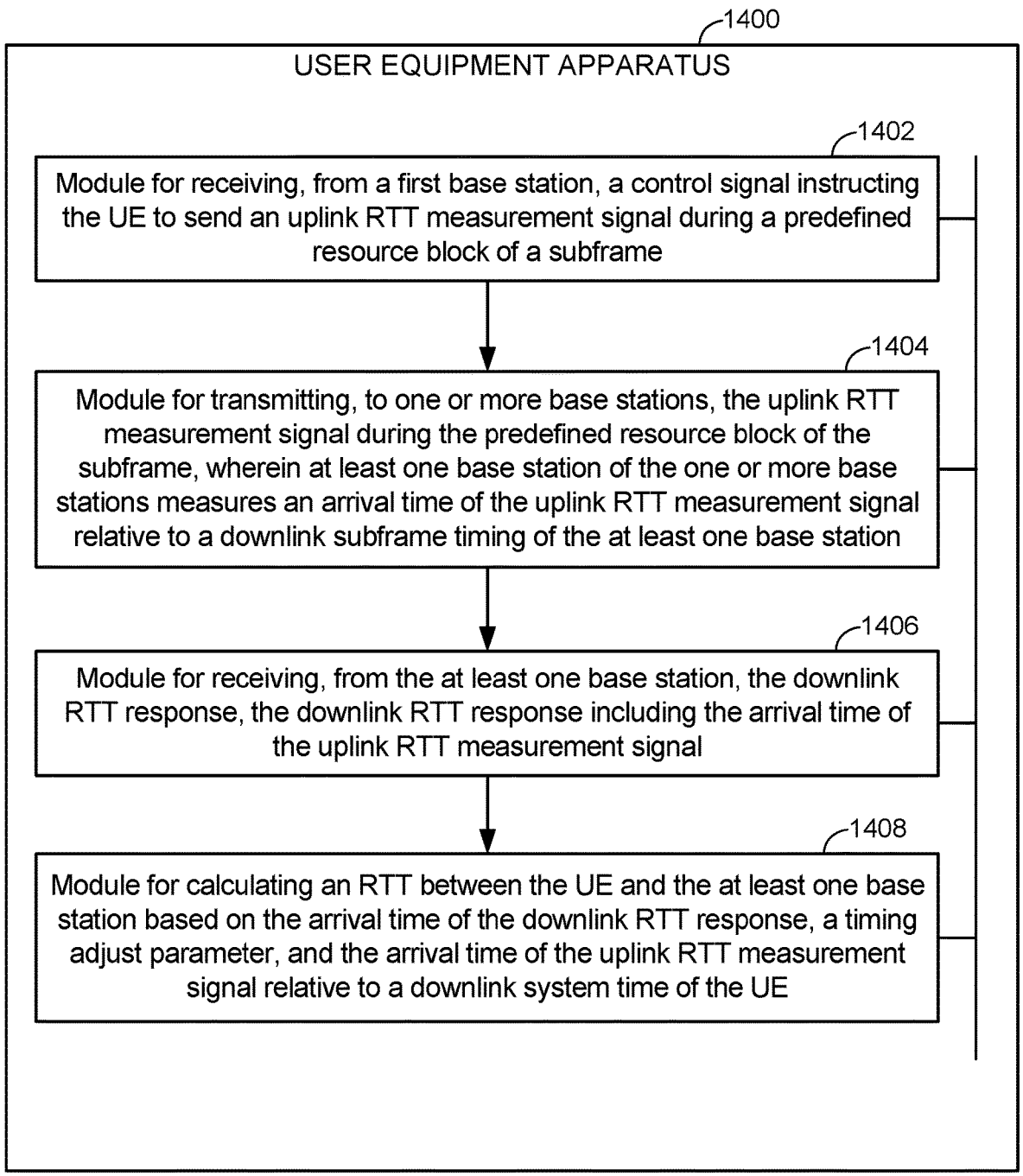

FIG. 14 illustrates an example user equipment apparatus 1400, such as UE 102, represented as a series of interrelated functional modules connected by a common bus. A module for receiving 1402 may correspond at least in some aspects to, for example, a communication device, such as communication device 308 in FIG. 3, and/or a processing system, such as processing system 332 in FIG. 3, as discussed herein. A module for transmitting 1404 may correspond at least in some aspects to, for example, a communication device, such as communication device 308 in FIG. 3, and/or a processing system, such as processing system 332 in FIG. 3, as discussed herein. A module for receiving 1406 may correspond at least in some aspects to, for example, a communication device, such as communication device 308 in FIG. 3, and/or a processing system, such as processing system 332 in FIG. 3, as discussed herein. A module for calculating 1408 may correspond at least in some aspects to, for example, a processing system, such as processing system 332 in FIG. 3, and/or a communication device, such as communication device 308 in FIG. 3, as discussed herein.

Figure 15:
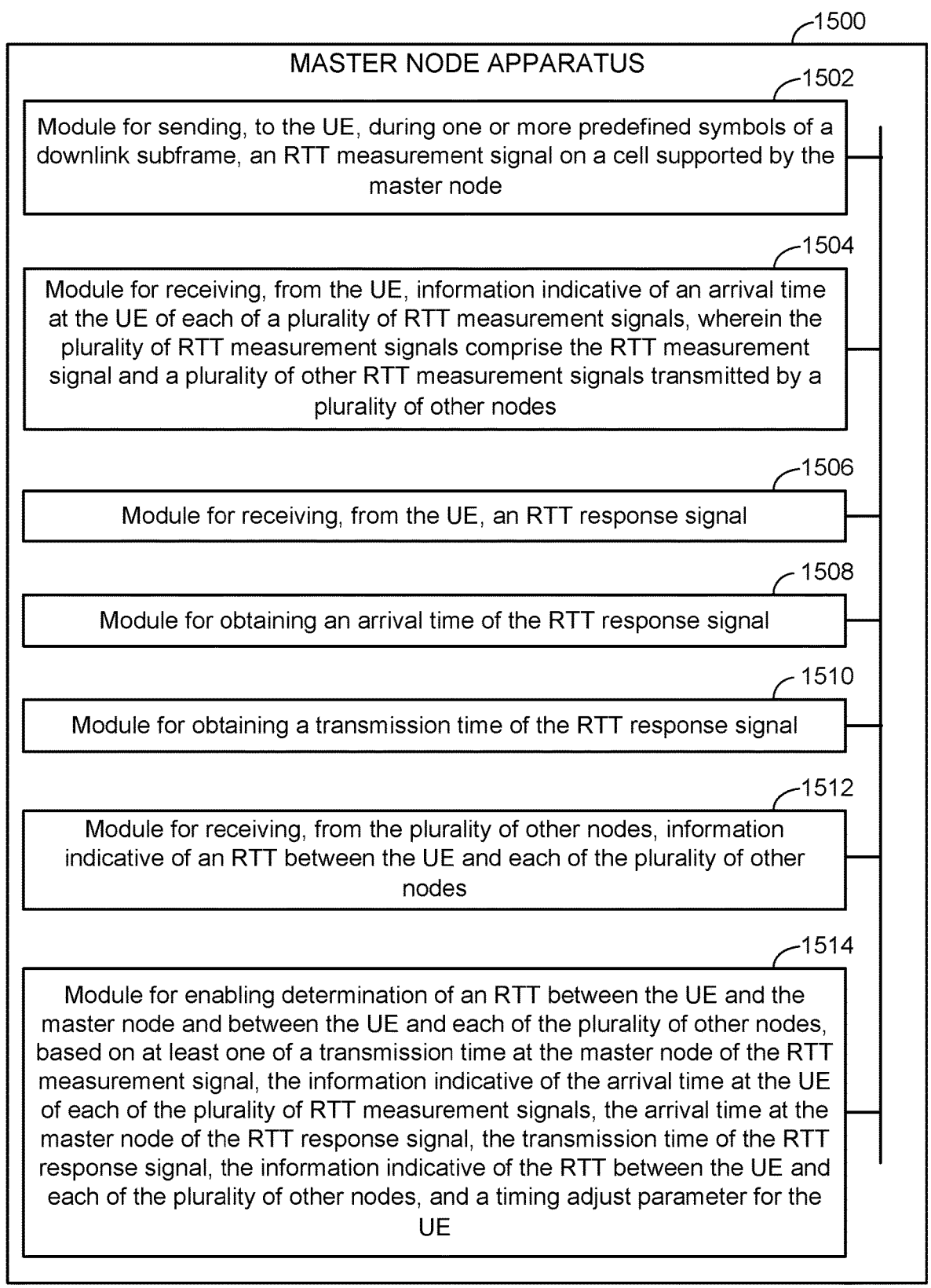

FIG. 15 illustrates an example master node apparatus 1500 (e.g., any of eNBs 202-206 or gNBs 502 and 622-626) represented as a series of interrelated functional modules connected by a common bus. A module for sending 1502 may correspond at least in some aspects to, for example, a communication device, such as communication device 314 in FIG. 3, and/or a processing system, such as processing system 334 in FIG. 3, as discussed herein. A module for receiving 1504 may correspond at least in some aspects to, for example, a communication device, such as communication device 314 in FIG. 3, and/or a processing system, such as processing system 334 in FIG. 3, as discussed herein. A module for receiving 1506 may correspond at least in some aspects to, for example, a communication device, such as communication device 314 in FIG. 3, and/or a processing system, such as processing system 334 in FIG. 3, as discussed herein. A module for obtaining 1508 may correspond at least in some aspects to, for example, a communication device, such as communication device 314 in FIG. 3, and/or a processing system, such as processing system 334 in FIG. 3, as discussed herein. A module for obtaining 1510 may correspond at least in some aspects to, for example, a communication device, such as communication device 314 in FIG. 3, and/or a processing system, such as processing system 334 in FIG. 3, as discussed herein. A module for receiving 1512 may correspond at least in some aspects to, for example, a communication device, such as communication device 314 in FIG. 3, and/or a processing system, such as processing system 334 in FIG. 3, as discussed herein. A module for enabling 1514 may correspond at least in some aspects to, for example, a communication device, such as communication device 314 in FIG. 3, and/or a processing system, such as processing system 334 in FIG. 3, as discussed herein.

Figure 16:
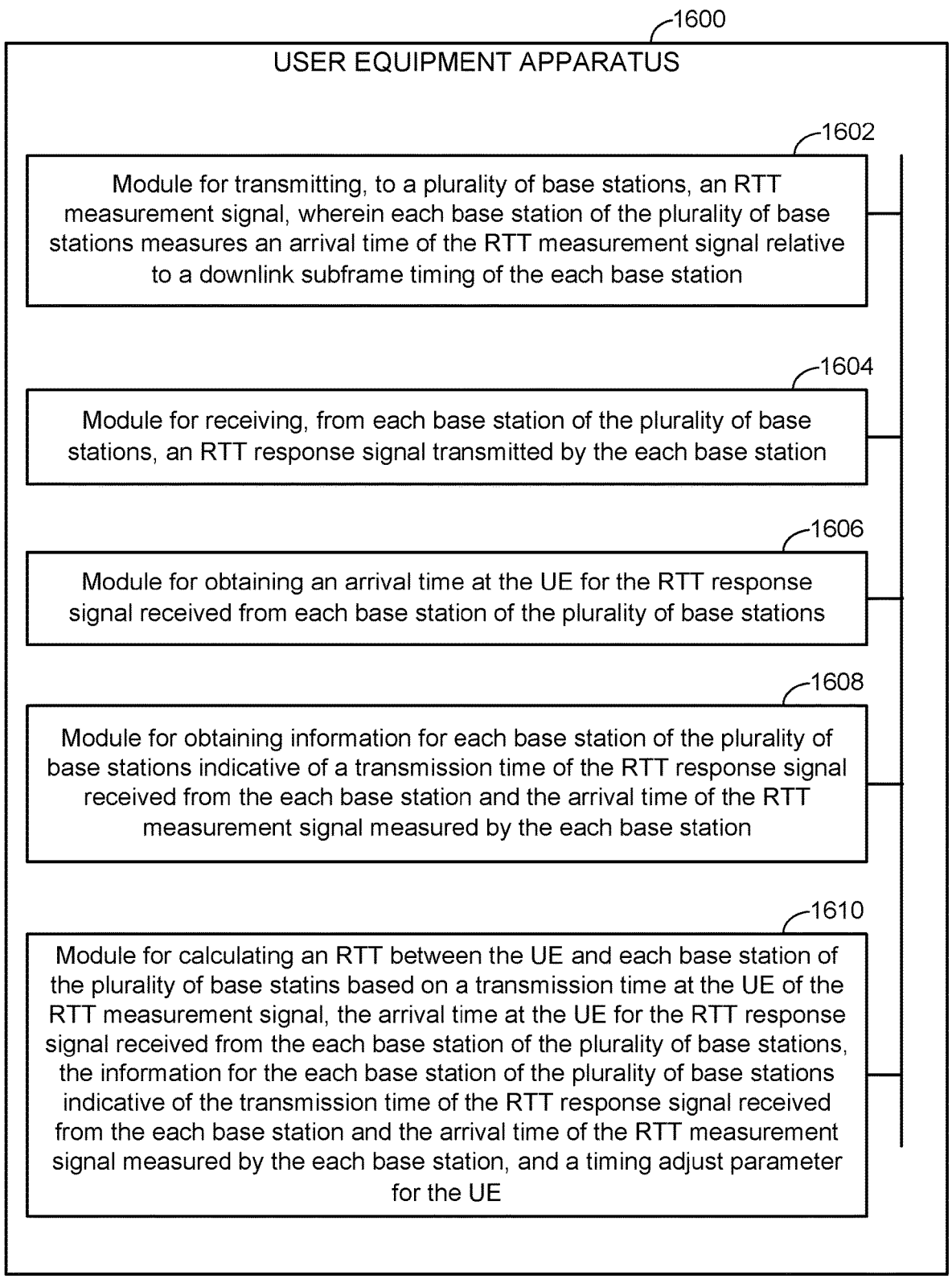

FIG. 16 illustrates an example user equipment apparatus 1600, such as UE 102, represented as a series of interrelated functional modules connected by a common bus. A module for transmitting 1602 may correspond at least in some aspects to, for example, a communication device, such as communication device 308 in FIG. 3, and/or a processing system, such as processing system 332 in FIG. 3, as discussed herein. A module for receiving 1604 may correspond at least in some aspects to, for example, a communication device, such as communication device 308 in FIG. 3, and/or a processing system, such as processing system 332 in FIG. 3, as discussed herein. A module for obtaining 1606 may correspond at least in some aspects to, for example, a communication device, such as communication device 308 in FIG. 3, and/or a processing system, such as processing system 332 in FIG. 3, as discussed herein. A module for obtaining 1608 may correspond at least in some aspects to, for example, a processing system, such as processing system 332 in FIG. 3, and/or a communication device, such as communication device 308 in FIG. 3, as discussed herein. A module for calculating 1610 may correspond at least in some aspects to, for example, a processing system, such as processing system 332 in FIG. 3, and/or a communication device, such as communication device 308 in FIG. 3, as discussed herein.

The functionality of the modules of FIGS. 13-16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 13-16, as well as other components and functions described herein, may be implemented using any suitable means. Such means also may be implemented, at least in part, using corresponding structure as taught herein. For example, the components described above in conjunction with the "module for" components of FIGS. 13-16 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE), comprising:
receiving an indication that a plurality of base stations will be transmitting a plurality of first round-trip-time (RTT) signals during one or more symbols of one or more downlink subframes;
receiving a request to report information indicative of an arrival time at the UE of each of the first plurality of RTT signals;
receiving the plurality of first RTT signals from the plurality of base stations;
transmitting, to the plurality of base stations, a second RTT signal, wherein the second RTT signal is transmitted after reception of the plurality of first RTT signals; and
transmitting, to a network entity, a plurality of first time difference measurements corresponding to the plurality of base stations, each first time difference measurement of the plurality of first time difference measurements representing a difference between an arrival time at the UE of a first RTT signal of the plurality of first RTT signals and a transmission time from the UE of the second RTT signal,
wherein the plurality of first time difference measurements enables the network entity to calculate a plurality of RTTs between the UE and the plurality of base stations based on the plurality of first time difference measurements, a timing adjust parameter for the UE, and a plurality of second time difference measurements reported to the network entity by the plurality of base stations, each second time difference measurement of the plurality of second time difference measurements representing a difference between an arrival time at a base station of the plurality of base stations of the second RTT signal and a transmission time from the base station of a first RTT signal of the plurality of first RTT signals, and
wherein the timing adjust parameter indicates an amount of time that UE transmission timing leads base station reception timing.

2. The method of claim 1, wherein:
the plurality of first RTT signals is a plurality of RTT measurement signals, and
the first RTT signal is an RTT response signal.

3. The method of claim 1, further comprising:
receiving the timing adjust parameter from a serving base station for the UE.

4. The method of claim 1, wherein the plurality of base stations comprises neighboring base stations within communication range of the UE.

5. The method of claim 1, wherein the network entity is a serving base station.

6. The method of claim 1, wherein the network entity is a location server.

7. A method of wireless positioning performed by a first base station, comprising:
transmitting a first round-trip-time (RTT) signal to a user equipment (UE), wherein the UE receives an indication that a plurality of base stations, including the first base station, will be transmitting a plurality of first round-trip-time (RTT) signals during one or more symbols of one or more downlink subframes, and wherein the UE receives a request to report information indicative of an arrival time at the UE of each of the first plurality of RTT signals;
receiving, from the UE, a second RTT signal, wherein the second RTT signal is received after transmission of the first RTT signal; and
transmitting a first time difference measurement to a network entity, the first time difference measurement representing a difference between a transmission time from the first base station of the first RTT signal and an arrival time at the first base station of the second RTT signal,
wherein the time difference measurement enables the network entity to calculate a plurality of RTTs between the UE and the plurality of base stations, including the first base station, based on a plurality of first time difference measurements, including the first time difference measurement, reported to the network entity by the plurality of base stations, a plurality of second time difference measurements reported to the network entity by the UE, and a timing adjust parameter for the UE, the plurality of first time difference measurements representing differences between arrival times at the plurality of base stations of the second RTT signal and transmission times from the plurality of base stations of the plurality of first RTT signals, including the first RTT signal, the plurality of second time difference measurements representing differences between arrival times at the UE of the plurality of first RTT signals and a transmission time from the UE of the second RTT signal, and
wherein the timing adjust parameter indicates an amount of time that UE transmission timing leads base station reception timing.

8. The method of claim 7, wherein:
the first RTT signal is an RTT measurement signal, and
the second RTT signal is an RTT response signal.

9. The method of claim 7, further comprising:
transmitting the timing adjust parameter to the network entity, wherein the first base station is a serving base station for the UE.

10. The method of claim 7, wherein the first base station is a serving base station for the UE.

11. The method of claim 7, wherein the first base station is a neighboring base station within communication range of the UE.

12. The method of claim 7, wherein the network entity is a location server.

13. A method of wireless positioning performed by a network entity, comprising:
transmitting, to a user equipment (UE), an indication that a plurality of base stations will be transmitting a plurality of first round-trip-time (RTT) signals during one or more symbols of one or more downlink subframes;

transmitting, to the UE, a request to report information indicative of an arrival time at the UE of each of the first plurality of RTT signals;

receiving, from the UE, a plurality of first time difference measurements corresponding to the plurality of base stations, each first time difference measurement of the plurality of first time difference measurements representing a difference between an arrival time at the UE of a first RTT signal of the plurality of first RTT signals from the plurality of base stations and a transmission time from the UE of a second RTT signal, wherein the second RTT signal is transmitted after reception of the plurality of first RTT signals;

receiving, from the plurality of base stations, a plurality of second time difference measurements, each second time difference measurement of the plurality of second time difference measurements representing a difference between a transmission time from the base station of a first RTT signal of the plurality of first RTT signals and an arrival time at a base station of the plurality of base stations of the second RTT signal; and estimating a location of the UE based on at least the plurality of first time difference measurements, the plurality of second time difference measurements, timing adjust parameter for the UE, wherein the timing adjust parameter indicates an amount of time that UE transmission timing leads base station reception timing.

14. The method of claim 13, wherein estimating the location of the UE comprises:
calculating a plurality of RTTs between the UE and the plurality of base stations based on the plurality of first time difference measurements and the plurality of second time difference measurements.

15. The method of claim 14, wherein the location of the UE is further estimated based on known locations of the plurality of base stations.

16. The method of claim 13, further comprising:
receiving the timing adjust parameter from a serving base station for the UE.

17. The method of claim 13, wherein:
the plurality of first RTT signals is a plurality of RTT measurement signals, and
the second RTT signal is an RTT response signal.

18. The method of claim 13, wherein the plurality of base stations comprises neighboring base stations within communication range of the UE.

19. The method of claim 13, wherein the network entity is a location server.

20. A user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, an indication that a plurality of base stations will be transmitting a plurality of first round-trip-time (RTT) signals during one or more symbols of one or more downlink subframes;
receive, via the one or more transceivers, a request to report information indicative of an arrival time at the UE of each of the first plurality of RTT signals;
receive, via the one or more transceivers, the plurality of first RTT signals from the plurality of base stations;

transmit, via the one or more transceivers, to the plurality of base stations, a second RTT signal, wherein the second RTT signal is transmitted after reception of the plurality of first RTT signals; and transmit, via the one or more transceivers, to a network entity, a plurality of first time difference measurements corresponding to the plurality of base stations, each first time difference measurement of the plurality of first time difference measurements representing a difference between an arrival time at the UE of a first RTT signal of the plurality of first RTT signals and a transmission time from the UE of the second RTT signal, wherein the plurality of first time difference measurements enables the network entity to calculate a plurality of RTTs between the UE and the plurality of base stations based on the plurality of first time difference measurements, a timing adjust parameter for the UE, and a plurality of second time difference measurements reported to the network entity by the plurality of base stations, each second time difference measurement of the plurality of second time difference measurements representing a difference between an arrival time at a base station of the plurality of base stations of the second RTT signal and a transmission time from the base station of a first RTT signal of the plurality of first RTT signals, and wherein the timing adjust parameter indicates an amount of time that UE transmission timing leads base station reception timing.

21. The UE of claim 20, wherein:
the plurality of first RTT signals is a plurality of RTT measurement signals, and
the first RTT signal is an RTT response signal.

22. The UE of claim 20, wherein the one or more processors, either alone or in combination, are further configured to:
receive, via the one or more transceivers, the timing adjust parameter from a serving base station for the UE.

23. The UE of claim 20, wherein the plurality of base stations comprises neighboring base stations within communication range of the UE.

24. The UE of claim 20, wherein the network entity is a serving base station.

25. The UE of claim 20, wherein the network entity is a location server.

26. A first base station, comprising:
one or more memories;
one or more transceivers; and
one or more processors communicatively coupled to the one or more memories and the one or more transceivers, the one or more processors, either alone or in combination, configured to:
transmit, via the one or more transceivers, a first round-trip-time (RTT) signal to a user equipment (UE), wherein the UE receives an indication that a plurality of base stations, including the first base station, will be transmitting a plurality of first round-trip-time (RTT) signals during one or more symbols of one or more downlink subframes, and wherein the UE receives a request to report information indicative of an arrival time at the UE of each of the first plurality of RTT signals;

receive, via the one or more transceivers, from the UE, a second RTT signal, wherein the second RTT signal is received after transmission of the first RTT signal; and transmit, via the one or more transceivers, a first time difference measurement to a network entity, the first time difference measurement representing a difference between a transmission time from the first base station of the first RTT signal and an arrival time at the first base station of the second RTT signal, wherein the time difference measurement enables the network entity to calculate a plurality of RTTs between the UE and the plurality of base stations, including the first base station, based on a plurality of first time difference measurements, including the first time difference measurement, reported to the network entity by the plurality of base stations, a plurality of second time difference measurements reported to the network entity by the UE, and a timing adjust parameter for the UE, the plurality of first time difference measurements representing differences between arrival times at the plurality of base stations of the second RTT signal and transmission times from the plurality of base stations of the plurality of first RTT signals, including the first RTT signal, the plurality of second time difference measurements representing differences between arrival times at the UE of the plurality of first RTT signals and a transmission time from the UE of the second RTT signal, and wherein the timing adjust parameter indicates an amount of time that UE transmission timing leads base station reception timing.

27. The first base station of claim 26, wherein:
the first RTT signal is an RTT measurement signal, and
the second RTT signal is an RTT response signal.

28. The first base station of claim 26, wherein the one or more processors, either alone or in combination, are further configured to:
transmit, via the one or more transceivers, the timing adjust parameter to the network entity, wherein the first base station is a serving base station for the UE.

29. The first base station of claim 26, wherein the first base station is a serving base station for the UE.

30. The first base station of claim 26, wherein the first base station is a neighboring base station within communication range of the UE.

31. The first base station of claim 26, wherein the network entity is a location server.

32. A network entity, comprising:
one or more memories;
one or more transceivers; and
one or more processors communicatively coupled to the one or more memories and the one or more transceivers, the one or more processors, either alone or in combination, configured to:
transmit, via the one or more transceivers, to a user equipment (UE), an indication that a plurality of base stations will be transmitting a plurality of first round-trip-time (RTT) signals during one or more symbols of one or more downlink subframes;
transmit, via the one or more transceivers, to the UE, a request to report information indicative of an arrival time at the UE of each of the first plurality of RTT signals;
receive, via the one or more transceivers, from the UE, a plurality of first time difference measurements corresponding to the plurality of base stations, each first time difference measurement of the plurality of first time difference measurements representing a difference between an arrival time at the UE of a first RTT signal of the plurality of first RTT signals from the plurality of base stations and a transmission time from the UE of a second RTT signal, wherein the second RTT signal is transmitted after reception of the plurality of first RTT signals;

receive, via the one or more transceivers, from the plurality of base stations, a plurality of second time difference measurements, each second time difference measurement of the plurality of second time difference measurements representing a difference between a transmission time from the base station of a first RTT signal of the plurality of first RTT signals and an arrival time at a base station of the plurality of base stations of the second RTT signal; and estimate a location of the UE based on at least the plurality of first time difference measurements, the plurality of second time difference measurements, timing adjust parameter for the UE, wherein the timing adjust parameter indicates an amount of time that UE transmission timing leads base station reception timing.

33. The network entity of claim 32, wherein the one or more processors configured to estimate the location of the UE comprises the one or more processors, either alone or in combination, configured to:
calculate a plurality of RTTs between the UE and the plurality of base stations based on the plurality of first time difference measurements and the plurality of second time difference measurements.

34. The network entity of claim 33, wherein the location of the UE is further estimated based on known locations of the plurality of base stations.

35. The network entity of claim 32, wherein the one or more processors, either alone or in combination, are further configured to:
receive, via the one or more transceivers, the timing adjust parameter from a serving base station for the UE.

36. The network entity of claim 32, wherein:
the plurality of first RTT signals is a plurality of RTT measurement signals, and
the second RTT signal is an RTT response signal.

37. The network entity of claim 32, wherein the plurality of base stations comprises neighboring base stations within communication range of the UE.

38. The network entity of claim 32, wherein the network entity is a location server.

39. A user equipment (UE), comprising:
means for receiving an indication that a plurality of base stations will be transmitting a plurality of first round-trip-time (RTT) signals during one or more symbols of one or more downlink subframes;
means for receiving a request to report information indicative of an arrival time at the UE of each of the first plurality of RTT signals;
means for receiving the plurality of first RTT signals from the plurality of base stations;
means for transmitting, to the plurality of base stations, a second RTT signal, wherein the second RTT signal is transmitted after reception of the plurality of first RTT signals; and
means for transmitting, to a network entity, a plurality of first time difference measurements corresponding to the plurality of base stations, each first time difference measurement of the plurality of first time difference measurements representing a difference between an arrival time at the UE of a first RTT signal of the plurality of first RTT signals and a transmission time from the UE of the second RTT signal, wherein the plurality of first time difference measurements enables the network entity to calculate a plurality of RTTs between the UE and the plurality of base stations based on the plurality of first time difference measurements, a timing adjust parameter for the UE, and a plurality of second time difference measurements reported to the network entity by the plurality of base stations, each second time difference measurement of the plurality of second time difference measurements representing a difference between an arrival time at a base station of the plurality of base stations of the second RTT signal and a transmission time from the base station of a first RTT signal of the plurality of first RTT signals, and wherein the timing adjust parameter indicates an amount of time that UE transmission timing leads base station reception timing.

40. A first base station, comprising:

means for transmitting a first round-trip-time (RTT) signal to a user equipment (UE), wherein the UE receives an indication that a plurality of base stations, including the first base station, will be transmitting a plurality of first round-trip-time (RTT) signals during one or more symbols of one or more downlink subframes, and wherein the UE receives a request to report information indicative of an arrival time at the UE of each of the first plurality of RTT signals;

means for receiving, from the UE, a second RTT signal, wherein the second RTT signal is received after transmission of the first RTT signal; and means for transmitting a first time difference measurement to a network entity, the first time difference measurement representing a difference between a transmission time from the first base station of the first RTT signal and an arrival time at the first base station of the second RTT signal, wherein the time difference measurement enables the network entity to calculate a plurality of RTTs between the UE and the plurality of base stations, including the first base station, based on a plurality of first time difference measurements, including the first time difference measurement, reported to the network entity by the plurality of base stations, a plurality of second time difference measurements reported to the network entity by the UE, and a timing adjust parameter for the UE, the plurality of first time difference measurements representing differences between arrival times at the plurality of base stations of the second RTT signal and transmission times from the plurality of base stations of the plurality of first RTT signals, including the first RTT signal, the plurality of second time difference measurements representing differences between arrival times at the UE of the plurality of first RTT signals and a transmission time from the UE of the second RTT signal, and wherein the timing adjust parameter indicates an amount of time that UE transmission timing leads base station reception timing.

41. A network entity, comprising:

means for transmitting, to a user equipment (UE), an indication that a plurality of base stations will be transmitting a plurality of first round-trip-time (RTT) signals during one or more symbols of one or more downlink subframes;

means for transmitting, to the UE, a request to report information indicative of an arrival time at the UE of each of the first plurality of RTT signals;

means for receiving, from the UE, a plurality of first time difference measurements corresponding to the plurality of base stations, each first time difference measurement of the plurality of first time difference measurements representing a difference between an arrival time at the UE of a first RTT signal of the plurality of first RTT signals from the plurality of base stations and a transmission time from the UE of a second RTT signal, wherein the second RTT signal is transmitted after reception of the plurality of first RTT signals;

means for receiving, from the plurality of base stations, a plurality of second time difference measurements, each second time difference measurement of the plurality of second time difference measurements representing a difference between a transmission time from the base station of a first RTT signal of the plurality of first RTT signals and an arrival time at a base station of the plurality of base stations of the second RTT signal; and means for estimating a location of the UE based on at least the plurality of first time difference measurements, the plurality of second time difference measurements, timing adjust parameter for the UE, wherein the timing adjust parameter indicates an amount of time that UE transmission timing leads base station reception timing.

42. A non-transitory computer-readable medium storing computer-executable instructions that, when executed by a user equipment (UE), cause the UE to:

receive an indication that a plurality of base stations will be transmitting a plurality of first round-trip-time (RTT) signals during one or more symbols of one or more downlink subframes;

receive a request to report information indicative of an arrival time at the UE of each of the first plurality of RTT signals;

receive the plurality of first RTT signals from the plurality of base stations;

transmit, to the plurality of base stations, a second RTT signal, wherein the second RTT signal is transmitted after reception of the plurality of first RTT signals; and transmit, to a network entity, a plurality of first time difference measurements corresponding to the plurality of base stations, each first time difference measurement of the plurality of first time difference measurements representing a difference between an arrival time at the UE of a first RTT signal of the plurality of first RTT signals and a transmission time from the UE of the second RTT signal, wherein the plurality of first time difference measurements enables the network entity to calculate a plurality of RTTs between the UE and the plurality of base stations based on the plurality of first time difference measurements, a timing adjust parameter for the UE, and a plurality of second time difference measurements reported to the network entity by the plurality of base stations, each second time difference measurement of the plurality of second time difference measurements representing a difference between an arrival time at a base station of the plurality of base stations of the second RTT signal and a transmission time from the base station of a first RTT signal of the plurality of first RTT signals, and wherein the timing adjust parameter indicates an amount of time that UE transmission timing leads base station reception timing.

43. A non-transitory computer-readable medium storing computer-executable instructions that, when executed by a first base station, cause the first base station to:

transmit a first round-trip-time (RTT) signal to a user equipment (UE), wherein the UE receives an indication that a plurality of base stations, including the first base station, will be transmitting a plurality of first round-trip-time (RTT) signals during one or more symbols of one or more downlink subframes, and wherein the UE receives a request to report information indicative of an arrival time at the UE of each of the first plurality of RTT signals;

receive, from the UE, a second RTT signal, wherein the second RTT signal is received after transmission of the first RTT signal; and transmit a first time difference measurement to a network entity, the first time difference measurement representing a difference between a transmission time from the first base station of the first RTT signal and an arrival time at the first base station of the second RTT signal, wherein the time difference measurement enables the network entity to calculate a plurality of RTTs between the UE and the plurality of base stations, including the first base station, based on a plurality of first time difference measurements, including the first time difference measurement, reported to the network entity by the plurality of base stations, a plurality of second time difference measurements reported to the network entity by the UE, and a timing adjust parameter for the UE, the plurality of first time difference measurements representing differences between arrival times at the plurality of base stations of the second RTT signal and transmission times from the plurality of base stations of the plurality of first RTT signals, including the first RTT signal, the plurality of second time difference measurements representing differences between arrival times at the UE of the plurality of first RTT signals and a transmission time from the UE of the second RTT signal, and wherein the timing adjust parameter indicates an amount of time that UE transmission timing leads base station reception timing.

44. A non-transitory computer-readable medium storing computer-executable instructions that, when executed by a network entity, cause the network entity to:

transmit, to a user equipment (UE), an indication that a plurality of base stations will be transmitting a plurality of first round-trip-time (RTT) signals during one or more symbols of one or more downlink subframes;

transmit, to the UE, a request to report information indicative of an arrival time at the UE of each of the first plurality of RTT signals;

receive, from the UE, a plurality of first time difference measurements corresponding to the plurality of base stations, each first time difference measurement of the plurality of first time difference measurements representing a difference between an arrival time at the UE of a first RTT signal of the plurality of first RTT signals from the plurality of base stations and a transmission time from the UE of a second RTT signal, wherein the second RTT signal is transmitted after reception of the plurality of first RTT signals;

receive, from the plurality of base stations, a plurality of second time difference measurements, each second time difference measurement of the plurality of second time difference measurements representing a difference between a transmission time from the base station of a first RTT signal of the plurality of first RTT signals and an arrival time at a base station of the plurality of base stations of the second RTT signal; and estimate a location of the UE based on at least the plurality of first time difference measurements, the plurality of second time difference measurements, timing adjust parameter for the UE, wherein the timing adjust parameter indicates an amount of time that UE transmission timing leads base station reception timing.

* * * * *